United States Patent [19]

Miyasaka et al.

[11] Patent Number: 5,393,288
[45] Date of Patent: Feb. 28, 1995

[54] THREE-DIMENSIONAL PROCESSING MACHINE AND A METHOD OF PROCESSING A WORKPIECE

[75] Inventors: Toshiaki Miyasaka; Shinya Nozawa; Takeshi Namiki, all of Tokyo, Japan

[73] Assignee: Mutoh Industries Ltd., Tokyo, Japan

[21] Appl. No.: 974,841

[22] Filed: Nov. 10, 1992

[30] Foreign Application Priority Data

| Nov. 26, 1991 | [JP] | Japan | 3-336174 |
| Jan. 31, 1992 | [JP] | Japan | 4-042122 |
| Mar. 5, 1992 | [JP] | Japan | 4-083285 |
| Mar. 31, 1992 | [JP] | Japan | 4-103856 |
| Mar. 31, 1992 | [JP] | Japan | 4-103858 |

[51] Int. Cl.⁶ ............ B23Q 3/155; B23Q 15/22
[52] U.S. Cl. ............ 483/1; 409/132; 483/31
[58] Field of Search ........ 409/132, 140, 149, 175, 409/181, 184, 186, 188, 210, 211, , 216, 218; 483/13, 16, 31, 1; 408/6, 7, 9, 12, 61

[56] References Cited

U.S. PATENT DOCUMENTS

| 1,696,032 | 12/1928 | Glover | 409/186 |
| 3,481,247 | 12/1969 | Hayes | 409/218 |
| 3,891,015 | 6/1975 | Calcagno | 409/210 X |
| 4,329,771 | 5/1982 | Eto et al. | 408/6 X |
| 4,651,405 | 3/1987 | McMurtry | 483/31 X |
| 4,784,541 | 11/1988 | Umehara et al. | 409/186 |
| 4,890,421 | 1/1990 | Moore, Jr. et al. | 408/61 |
| 4,979,284 | 12/1990 | McMurtry et al. | 483/31 X |
| 5,094,574 | 3/1992 | Nishigai et al. | 409/132 |

FOREIGN PATENT DOCUMENTS

| 0077140 | 4/1983 | European Pat. Off. . |
| 2072277 | 9/1971 | France . |
| 2616615 | 12/1988 | France . |
| 3604930 | 10/1986 | Germany . |
| 3906254 | 8/1990 | Germany . |

Primary Examiner—Z. R. Bilinsky
Attorney, Agent, or Firm—Sughrue, Mion, Zinn, Macpeak & Seas

[57] ABSTRACT

A spindle head 28 is liftably supported on a transfer member 6 which is capable of moving in an XY axis direction to a table 4, and a spindle 32 is rotatably journalled on the spindle head 28. A pickup 54 is liftably journalled on the spindle head 28, and the pickup 54 is disposed at the lower end of a tool 46 near the tip of the tool 46 which is fixed detachably to the spindle 32. The relative lifting motion of the pickup 54, against the head 28, is detected by a sensor 70. Prior to the processing of the work, a distance D, between the lower end of the pickup 54 and the tip of the tool 46, is measured, and is stored in the controller. The head 28 descends, and when the pickup 54 abuts on the work, this abutting condition is detected by the sensor 70. The height of the tip of the tool 46 against the work 2 is detected by the foregoing detection. After the lower end of the pickup 54 abuts on the work 2, if the head 28 is made to descend by the distance D, the tip of the tool 46 reaches the upper end of the work 2, and this position is used as the origin base of the Z axis. Then the engraving processing of a predetermined depth of cut is applied to the work 2 by the tool 46.

6 Claims, 23 Drawing Sheets

THREE-DIMENSIONAL PROCESSING MACHINE AND A METHOD OF PROCESSING A WORKPIECE

DESCRIPTION OF THE PRIOR ART

In the conventional three-dimensional measuring instrument, as shown in FIG. 29, a transfer member 54 is provided which is capable of moving in a biaxial direction in a plane parallel to a base 50. A spindle head 56 is connected liftably to this transfer member 54. A spindle connected to a rotary drive device is mounted on this spindle head 56, and a tool 60 is mounted on this spindle. Also, a stopper 58 is fixed to the spindle head 56. The tip of the tool 60 projects from the lower end of the stopper 58 by a depth of cut D against the workpiece 52. When the workpiece 52 on the base 50 is to be processed with a predetermined depth of cut, the spindle head 56 descends until the stopper 58 abuts on the workpiece 52, while rotating the tool 60, and the tool 60 penetrates into the workpiece 52 by the distance D. The transfer member 54 is controlled for movement in the biaxial direction, with the stopper 58 abutting position as the base, while the stopper is abutting on the workpiece 52, and the workpiece 52 is subjected to a three-dimensional processing with the predetermined depth of cut D by means of the tool 60.

Also, in the case where the stopper 58 is not used, the spindle head descends from the predetermined lifting position while the spindle is in static condition, and the tool is caused to abut on the workpiece once. The controller detects the height of the workpiece by memorizing this abutting position, and the height of the tool is used as the origin on the Z axis of the tool.

SUMMARY OF THE INVENTION:

This invention relates to a three-dimensional processing machine in which a spindle head moves in XY directions to the surface of a table. The spindle head is controlled of its lifting motion in Z axis perpendicular to the surface of the table, and three-dimensional processing is achieved on a workpiece on the table by means of a tool held by the spindle head.

According to the Z axis origin-detecting method for detection of the height of a workpiece by actually causing a tool to abut on the workpiece, the Z axis origin-detecting operation against the workpiece must be carried out whenever the workpiece is changed which results in troublesome processing operations. Also, when the tool is caused to contact the workpiece, there is the concern of causing damage to the workpiece.

Furthermore, in the conventional technique utilizing the stopper, damage occurs to the workpiece when the workpiece comes under pressure by the stopper. Also, if chips adhere to the lower part of the stopper, the Z axis origin of the tool must be changed.

An object of this invention is to eliminate the foregoing drawback by the simple detection of the height of the tool against the workpiece without the actual abutment of the tool on the workpiece.

In order to achieve the foregoing object, this invention provides that a spindle head is liftably supported on a transfer member capable of moving in optional directions on XY biaxial planes parallel to the table, and a spindle is rotatably journalled on the spindle head. A pickup is liftably journalled on the spindle head, and this pickup is placed at the bottom of the tool near the tip of the tool which is fixed detachably to the spindle. A displacement in the lifting direction of the pickup from the predetermined position against the spindle head is detected by a sensor. Prior to the machining process being applied to a workpiece, the distance D between the lower end of the pickup and the tip of the tool is measured, when the pickup is positioned at the predetermined position against the spindle head, and the value is stored in the controller. When the spindle head descends, the pickup abuts on the workpiece and the position of the pickup against the spindle head is displaced from the predetermined position, this displaced condition is detected by the sensor, and the height of the tip of the tool against the workpiece is detected. When the lower end of the pickup abuts on the workpiece, the position of the pickup against the spindle head is displaced from the predetermined position and the spindle head descends by the distance D, the tip of the tool reaches the upper end of the work accurately. This position is used as the origin on the Z axis of the spindle head, and the engraving process of the predetermined depth on the work can be achieved by the tool.

As described in the foregoing, this invention provides that the origin in the Z axis direction of the spindle head is not detected by causing the tool to abut on the workpiece directly so that the workpiece will not be damaged. Also, even if the workpiece is changed, with the utilization of an amount of descent of the spindle head from the basic position initially stored, until the abutment of the workpiece on the workpiece detection sensor, setting the origin again is not necessary on the Z axis of the spindle head against the workpiece, and thus, the workpiece can be lowered as it is with the Z origin as the base.

Also, this invention provides that the spindle head descends from the lifting basic position to each of a number of measuring points of the workpiece, and a coordinate position on the axis of each measuring point is obtained. The workpiece imaginary surface data is detected from the coordinate values on the Z axis and the coordinate values on the XY axis of each of a number of measuring points against the workpiece by the spindle head. The processing of the fixed depth of cut is achieved on the workpiece by the tool with the workpiece imaginary surface data as the base.

As described in the foregoing, since this invention employs the detection of the workpiece imaginary surface prior to the processing of the workpiece, a stopper is not needed at the time of the actual processing of the workpiece, which prevents damage to the workpiece. Also, as the workpiece imaginary surface is recognized in the first place, there is no need for detecting the Z axis origin against the workpiece for each descent operation of the tool, and thus, shortening of the total processing time of the workpiece can be achieved. Furthermore, at each workpiece measuring time, when the pickup is used, there is no need for the tool to contact the workpiece, there is no concern of damaging the workpiece, and thus, the spindle head can be lowered at a faster speed, thus saving time. The measurement of the Z axis coordinates on the workpiece surface can be achieved and the measuring time can be reduced.

This invention is provided with a pickup supporting means for releasably supporting the pickup at a position elevated higher than the tool.

With the foregoing construction of this invention, the pickup can be locked at the elevated position at the workpiece processing time by the tool, even if the chips adhere to the pickup, whereby staining of the workpiece surface with the chips caused by the pickup or damage to the workpiece can be avoided.

Because account of the prevention of the wear and tear of the pickup, the detection error by the pickup can be prevented.

Furthermore, this invention is provided with a pickup detaching mechanism which is capable of mounting and dismounting the pickup on the spindle head.

With the foregoing construction of this invention, the height detection of the workpiece can be achieved speedily without damage to the workpiece, and moreover, the operation of the tool processing can be achieved by detaching the pickup, thus, eliminating a dead angle by the pickup, and the tool processing condition can be easily seen.

The workpiece surface will not be stained or damaged by the pickup. And since the wear and tear of the pickup can be prevented, the detection error, due to the pickup, can be prevented.

DETAILED DESCRIPTION OF THE PREFERRED EMBODIMENTS

The construction of this invention will be described in detail in the following by referring to embodiments shown in attached drawings.

Figure 3:
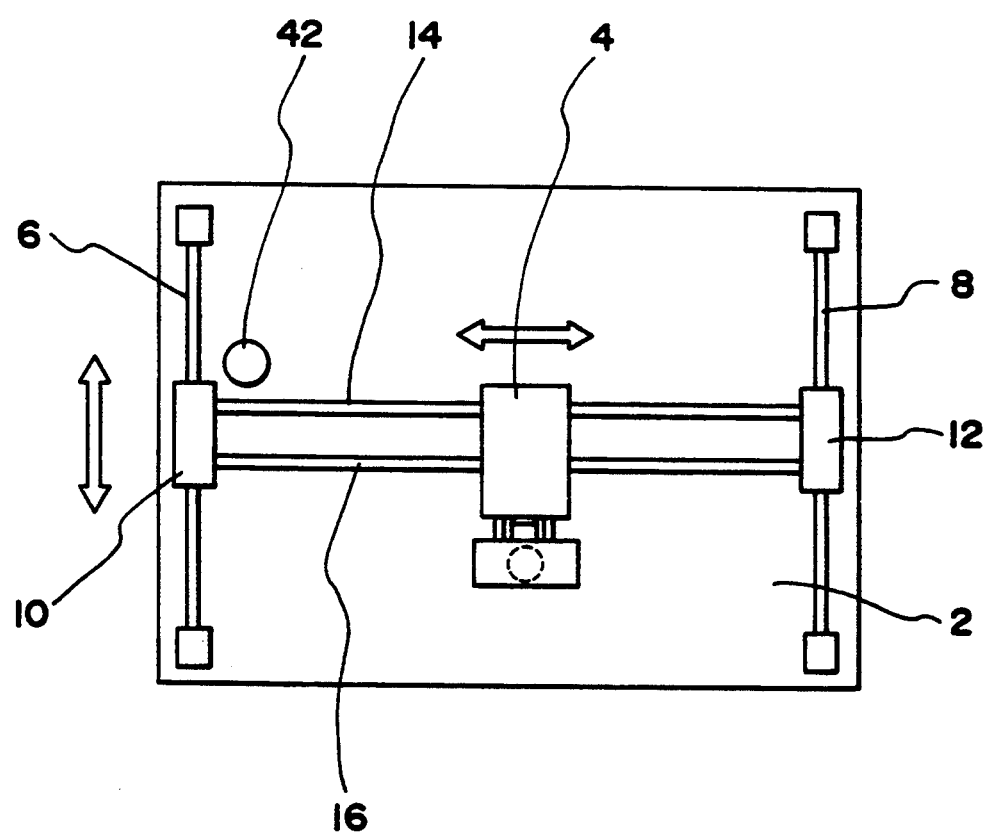
FIG. 3 is an almost entire schematic plan of the three-dimensional processing machine.

FIG. 3 shows a three-dimensional processing machine of the first embodiment. This machine is provided with a table 2 formed with a workpiece supporting surface on which the workpiece is mounted and positioned. Reference numeral 4 denotes a transfer member, which is supported by an XY guide mechanism capable of moving parallel in the desired X-Y directions in a plane parallel to the table 2. The guide mechanism is composed of Y axis rails 6 and 8, which are fixed to the table 2, and X axis rails 14 and 16, which are mounted on cursors 10 and 12 capable of transferring along the rails. The transfer member 4 is connected transferably to the X axis rails 14 and 16.

Figure 1:
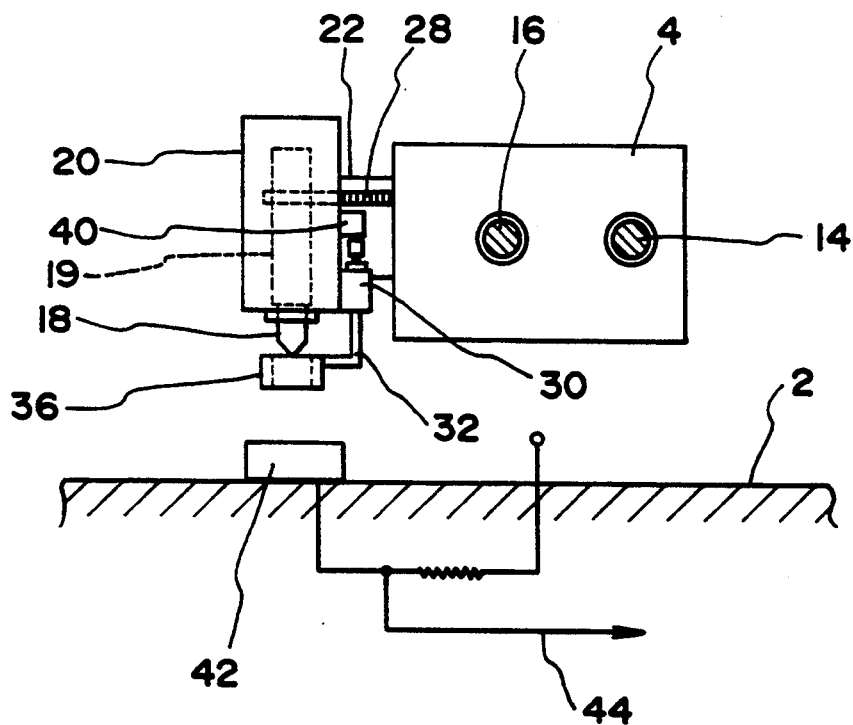
FIG. 1 is a side view of a spindle head of a three-dimensional processing machine of the first embodiment.
Figure 2:
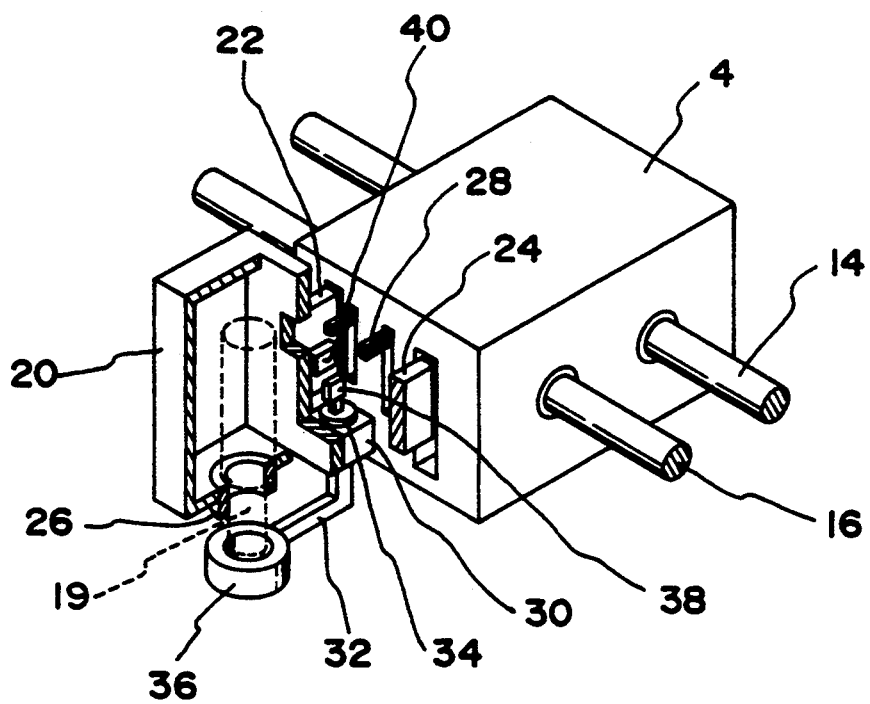
FIG. 2 is a perspective view in which part of the spindle head of the three-dimensional processing machine is cut away.

The cursors 10 and 12 and the transfer member 4 are connected to the XY axis drive device to be controlled by a controller. As shown in FIGS. 1 and 2, a spindle head 20 is mounted liftably on the transfer member 4 which holds the spindle 19 rotatably. A tool 18 is detachably fixed to the spindle 19. A lifting member (not shown) is liftably disposed inside the transfer member 4, and support arms 22 and 24 are fixed to the lifting member. The spindle head 20 is supported on the support arms 22 and 24.

The spindle 19 is rotatably supported on a support portion 26 provided on the spindle head 20, and the spindle 19 is interlocked with a rotary drive device (not shown) provided on a lifting member of the transfer member 4 by means of a belt 28. The lifting member is connected to the lifting drive device, and the lifting motion of the lifting member is converted to a pulse signal by an encoder, and is transmitted to the controller.

The controller is constructed in such a way that the pulse signals of the encoder are counted by a pulse counter, whereby an amount of lift from the basic position (zero position) of the lifting member, namely the spindle head 20, may be measured.

Numeral 30 denotes an arm supporting member mounted on the spindle head 20, and a vertical portion of the L type arm 32 is slidably supported on the arm supporting member in a perpendicular direction against the table 2. This perpendicular portion is engaged on the upper surface of the supporting member 30 by a stopper 34.

An annular insulating pickup 36 is mounted on a lower level horizontal portion of the arm 32 which is positioned at the bottom of the tool 18. A flag 38 is mounted on the upper end of the perpendicular portion of the arm 32, and the flag 38 is positioned below a flag sensor 40 which is mounted on the spindle head 20. This flag sensor 40 constitutes a pickup displacement-detector.

Numeral 42 denotes a work-detection sensor, consisting of an electric conductor of a rectangular parallelepiped mounted and fixed on a plane of an insulator of the table 2. A voltage is applied to the sensor. When an electric conductor, such as the tool 18 and the like, touches the workpiece detection sensor 42, and the sensor 42 is grounded through the electric conductor, an object-detection signal is emitted from a line 44 to the controller. A switch for manipulation, which controls the transfer member 4 and the drive device of the lifting member, is provided on an operation panel of the three-dimensional processing machine.

The operation of this embodiment will be described in the following.

Figure 6:
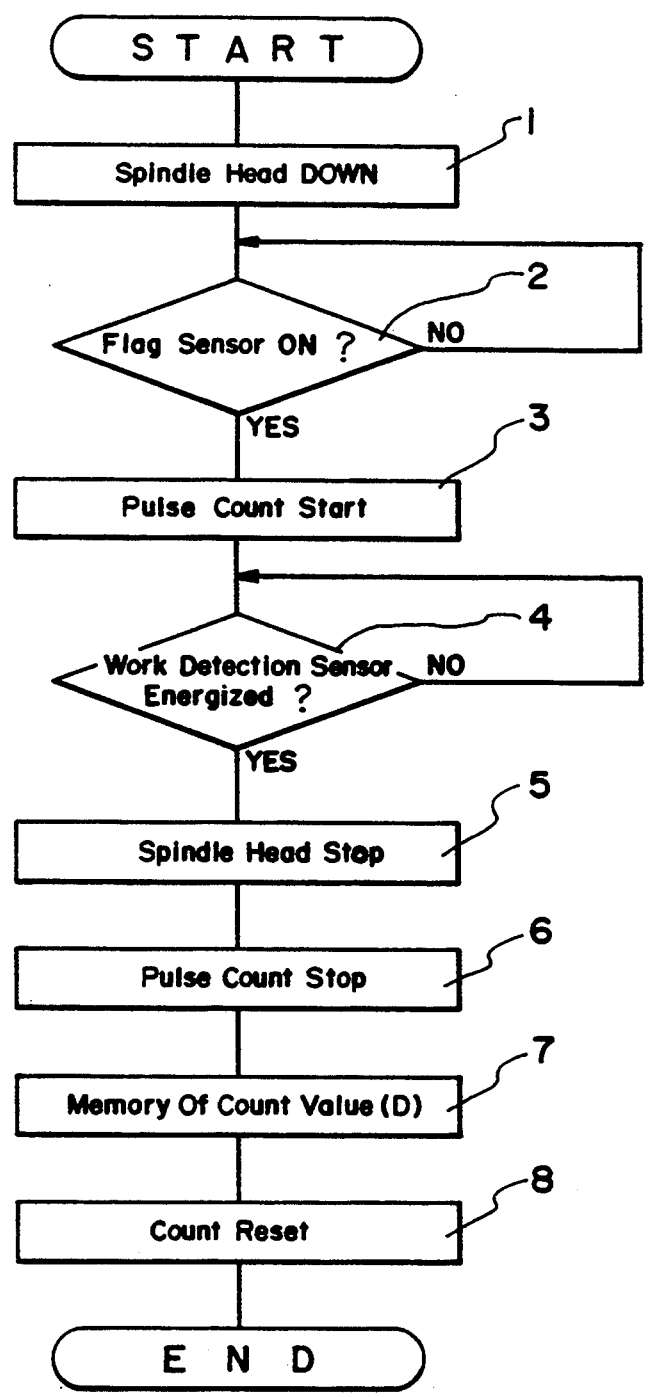
FIG. 6 is a flow chart showing the operation of a controller of the three-dimensional processing machine.

In the first place, the operation of measuring the descending distance D of the head 20, from a basic height level against the table 2, to a position where the tip of the tool 18 abuts on the work-detection sensor 42, is described by referring to the flow chart shown in FIG. 6. The distance D corresponds to the distance between the tool 18 and the spindle 19.

Figure 4A:
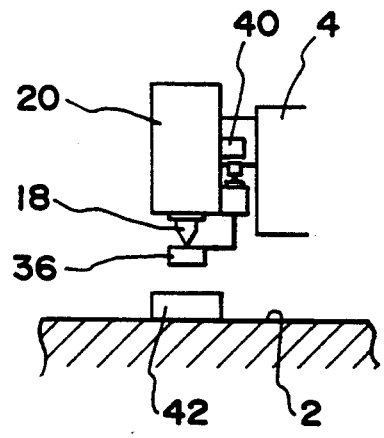
FIGS. 4(A)–4(D) are operation explanatory views of the three-dimensional processing machine.
Figure 4B:
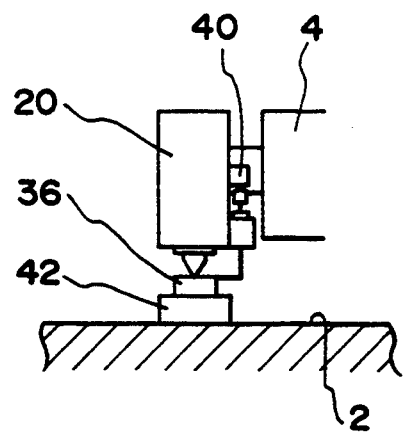
Figure 4C:
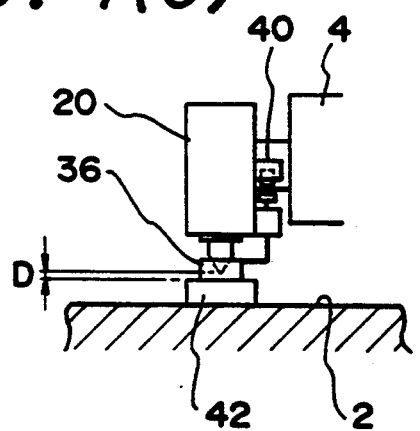
Figure 4D:
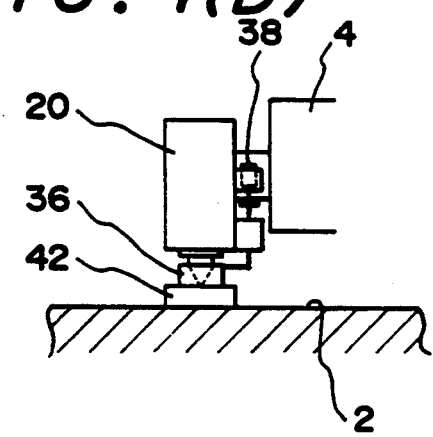

As shown in FIG. 4A, the spindle head 20 is positioned above the work-detection sensor 42, and the spindle head 20 descends to the position shown in FIG. 4B (step 1). The controller judges if the flag sensor 38 turns ON or not in step 2, and when the ON is confirmed (refer to FIG. 4C), the pulse counter is reset, and counting of the amount of descent of the spindle head 20, from the basic position, starts (step 3). Next, the controller judges if the tip of the tool 18 abuts on the work-detection sensor 42 or not (step 4), and when the affirmative is judged (refer to FIG. 4D), the descent of the spindle head 20 stops (step 5). Furthermore, when counting of the amount of descent of the spindle head 20 stops (step 6), the count value D of the counter is stored in the memory of the controller. And then, the counter is reset (step 8).

Figure 5:
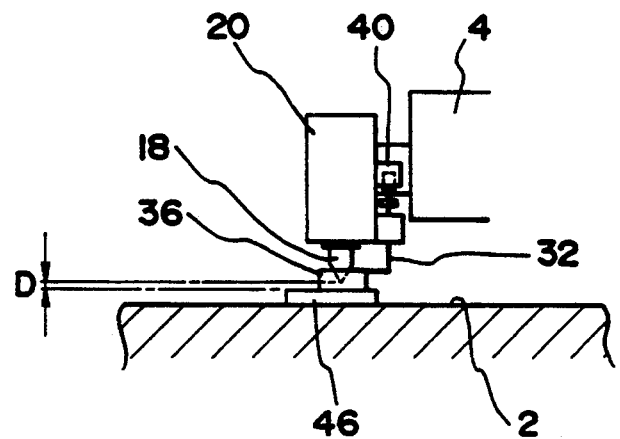
FIG. 5 is an operation explanatory view of the three-dimensional processing machine.
Figure 7:
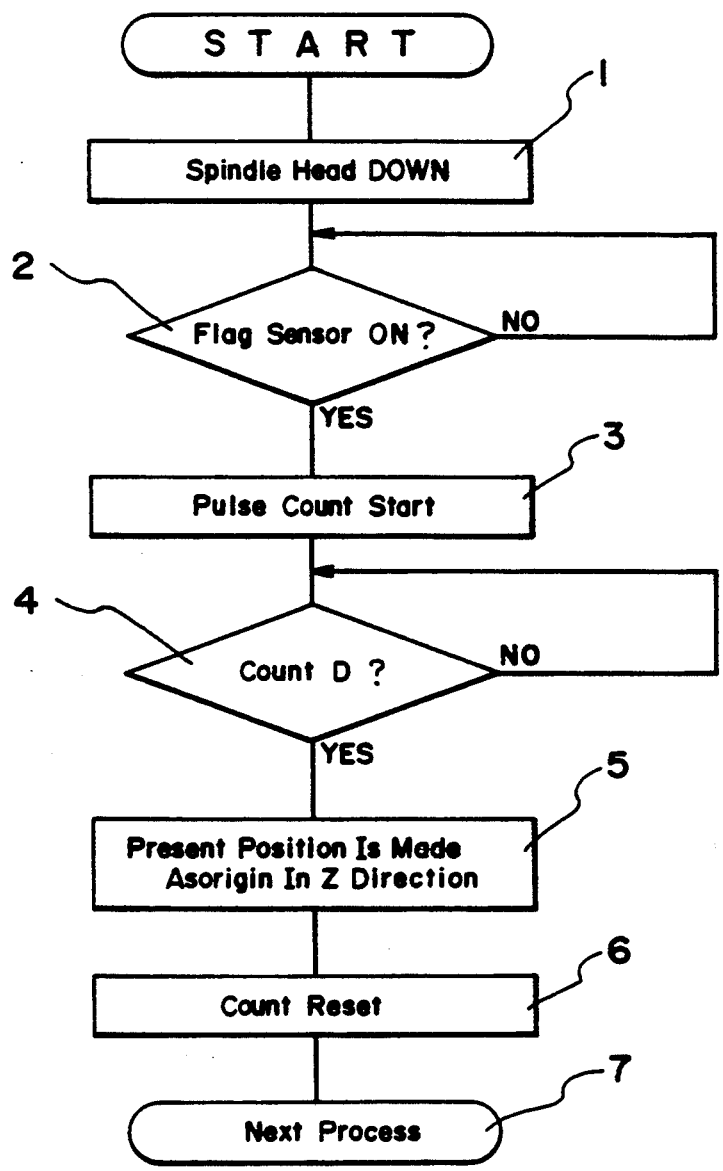
FIG. 7 is a flow chart showing an operation of a controller of the three-dimensional processing machine.

Next, an operation of detecting the origin on the Z axis of the spindle head 20 against the workpiece (refer to FIG. 5) to be actually processed is described by referring to the flow chart shown in FIG. 7.

In the first place, the tool 18 is positioned above the workpiece 46, and the spindle head 20 descends from the basic position (step 1).

When the spindle head 20 descends, the pickup 36 abuts on the workpiece 46. Also, when the spindle head 20 descends, the perpendicular portion of the arm 32 rises relative to the spindle head 20, according to the descent of the spindle head 20, and the flag 38 moves towards the flag sensor 40.

The controller judges if the flag sensor 40 turns ON or not in step 2. When the affirmative is judged, the pulse counter is reset to zero and the counting of the amount of descent of the spindle head 20 starts from the basic position (step 3).

When the spindle head 20 descends by the distance D, the position is confirmed by the counter (step 4), and this position is made as the origin on the Z axis of the spindle head 20 (step 5). The counter is then reset to zero (step 6).

The controller moves to the work processing operation, with the origin on the Z axis of the spindle head 20 as the base, and it controls the lifting of the spindle head 20 against the workpiece 46. The spindle head 20 moves in the XY axis direction, and the workpiece 46 is processed by the tool 18 (step 7).

A second embodiment of this invention will be described in detail in the following by referring to FIG. 8 through FIG. 12.

Figure 9:
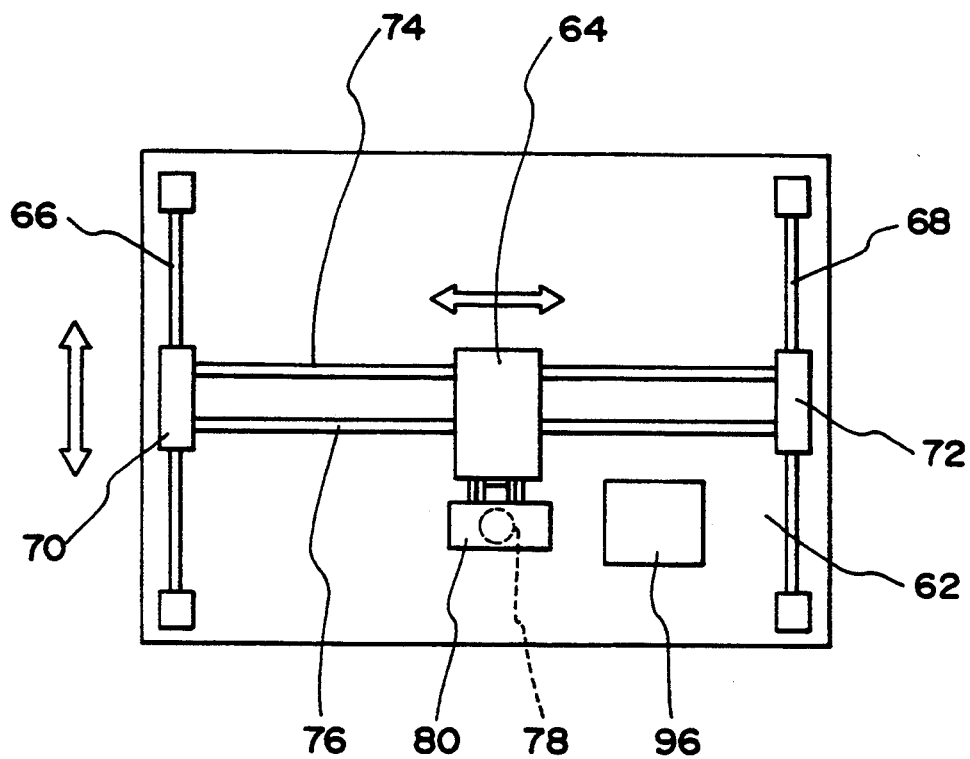
FIG. 9 is an entire schematic plan of the three-dimensional processing machine shown in FIG. 8.
Figure 10:
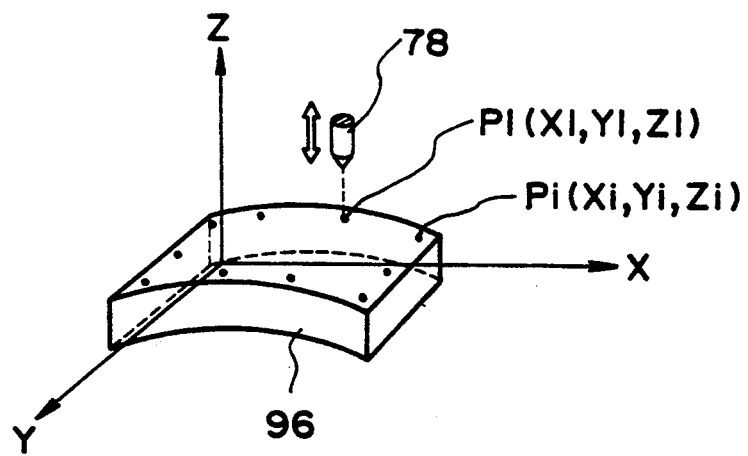
FIG. 10 is an operation explanatory view of the three-dimensional processing machine shown in FIG. 8.

FIG. 9 shows a three-dimensional processing machine. This processing machine is provided with a table 62 formed with a work supporting surface on which the work is mounted and positioned. Numeral 64 denotes a transfer member, which is supported by the XY guide mechanism capable of moving parallel in the desired X-Y axis direction in a plane parallel to the table 62. The XY guide mechanism is composed of Y axis rails 66 and 68 which are fixed to the table 62, and X axis rails 74 and 75 which are mounted on the cursors 70 and 72 which are capable of moving along the rails. The transfer member 64 is connected movably to the X axis rails 74 and 76.

Figure 8:
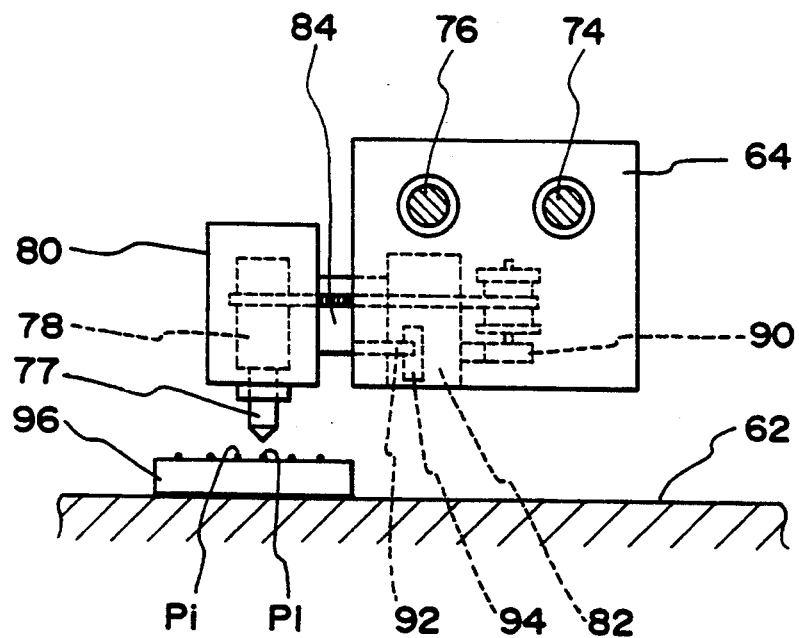
FIG. 8 is a side view of a spindle head of a three-dimensional processing machine of a second embodiment of this invention.

The cursors 70 and 72 and the transfer member 64 are connected to the drive device to be controlled by the controller. As shown in FIG. 8, a spindle head 80, that holds a spindle 78 rotatably, is liftably mounted on the transfer member 64. A tool 77 is detachably mounted on the spindle 78. An actuator 82 for lifting the head is disposed inside the transfer member 64, and a supporting arm 84 is fixed to an output lifting member of the actuator 82. The spindle head 80 is supported by the supporting arm 84.

The spindle 78 is rotatably supported on a support portion provided on the spindle head 80, and the spindle 78 is connected to an output shaft of a motor 90, in the transfer member 64, by means of a belt 86 and a pulley 88. The motor 90 is connected to the output lifting member of the actuator 82. A sensor flag 92 is mounted on the arm 84, and the sensor flag 92 is opposite to a position-detection sensor 94 disposed on the output lifting member.

The amount of lifting from the basic position of the spindle head 80 is detected by the sensor 94, and the detection signal is transmitted to the controller as the lifting position signal of the spindle head 80. The actuator 82 for lifting the head and the motor 90 are connected and controlled by the controller.

Figure 12:
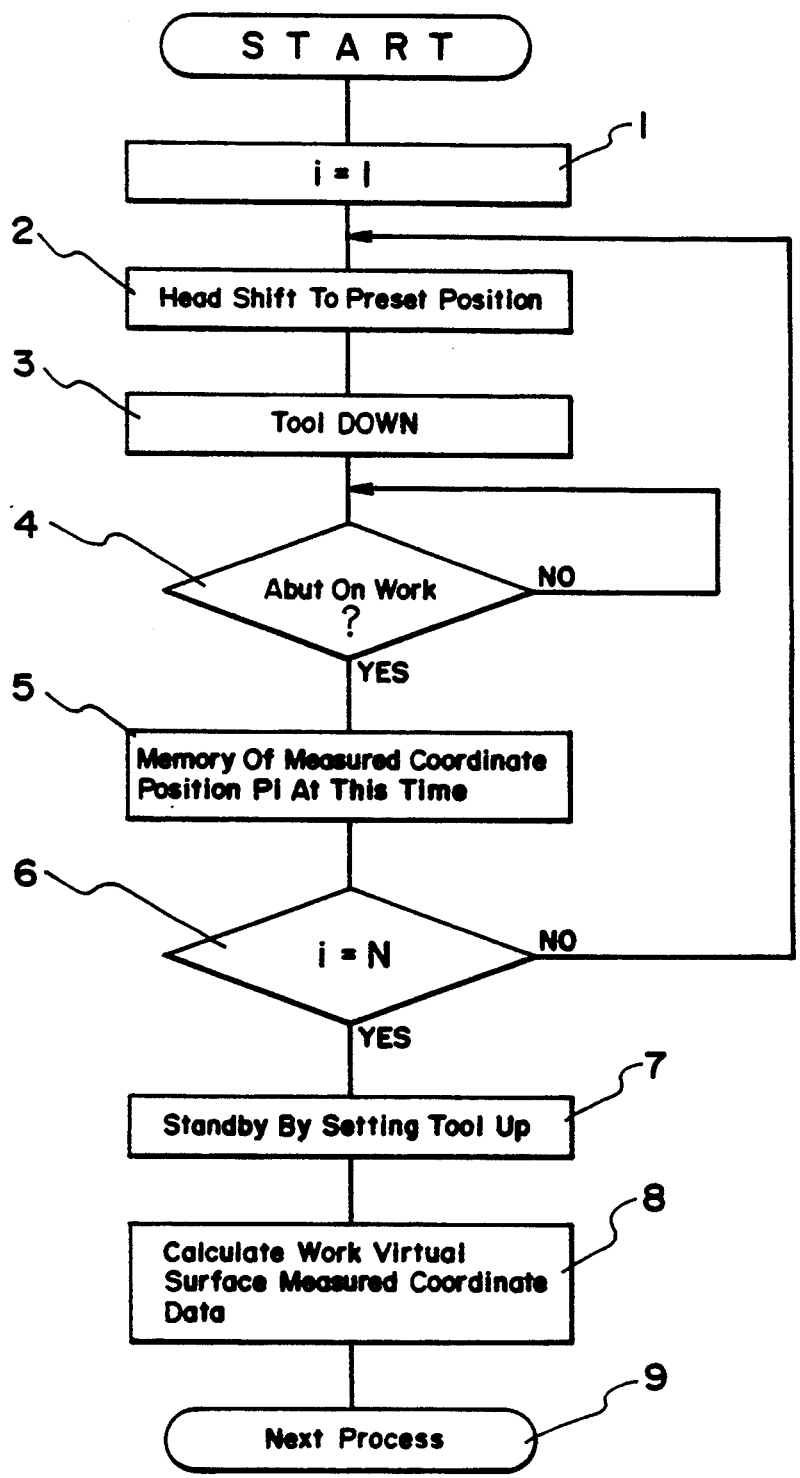
FIG. 12 is a flow chart showing the operation of a controller of the three-dimensional processing machine shown in FIG. 8.

The operation of this embodiment will be described in detail in the following by referring to a flow chart shown in FIG. 12.

In the first place, a workpiece 96 is set on the table 62. Then, in step 1, i=1 is set. Letter i denotes a measurement operation frequency, and a maximum value is set at N. Next, an operator controls the movement of the transfer member 64 in the XY axis direction on the table 62 by a manual switch, and moves the tip of the tool 78 above a measuring point P1 on the workpiece 96 (step 2).

Next, the operator manipulates the manual switch to lower the spindle head 80, from the highest basic position, slowly, and causes the tip of the tool 77 to abut on the desired measuring point P1 of the workpiece 96. The operator confirms that the tool abuts on the workpiece 96 in step 4, and stops the descent of the spindle head 80. An arrangement is made so that the contact of the tool 77 against the workpiece 96 enables the detection of the grounding of a voltage supply circuit with the workpiece 96, by previously applying a voltage to the tool 77.

The controller stores the amount of descent from the standard position of the spindle head 80, namely the tool 77 as Z1, by the signal from the sensor 94, and stores the positions X1, Y1 on the XY axis of the tool 77. The X1, Y1 and Z1 constitute the coordinate data on the XYZ axis of the measuring point P1. When operation is repeated by changing the measuring point Pi by the predetermined distance until i=N is obtained, the coordinates of the measuring point P1 on the workpiece 96 are sequentially measured, and the coordinate data (Xi, Yi and Zi) of each measuring point Pi is stored. In step 6, when the operator judges i=N, the spindle head 80 is lifted to the highest standby position (step 7).

Figure 11:
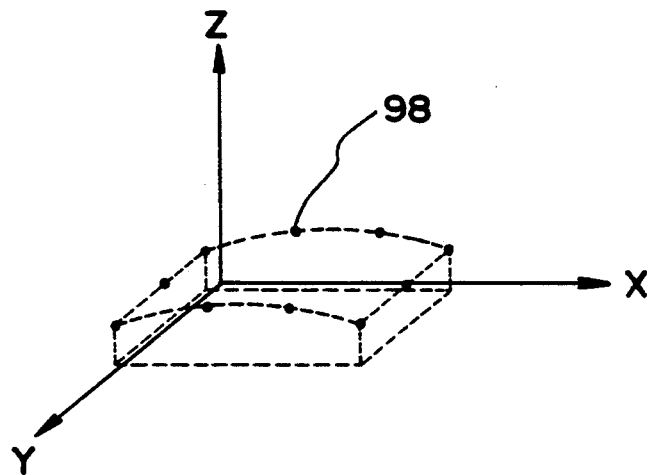
FIG. 11 illustrates generation of the imaginary surface.

The controller finds the imaginary surface data 98 of the work 96 as shown in FIG. 11 from the imaginary surface data (Xi, Yi and Zi) ($1 \leq i \leq N$) of each measuring point Pi. In effect, the above data is obtained by utilizing the Bezier curve or B spline curve.

Next, the controller rotates the spindle 78 and controls the movement of the transfer member 64 in the XY axis direction, with the data 98 of the imaginary surface of the work 96 as the Z axis base, controls the movement of the spindle head 8 in the Z axis direction, and performs the processing of a fixed depth on the work 96 (step 9).

Figure 13:
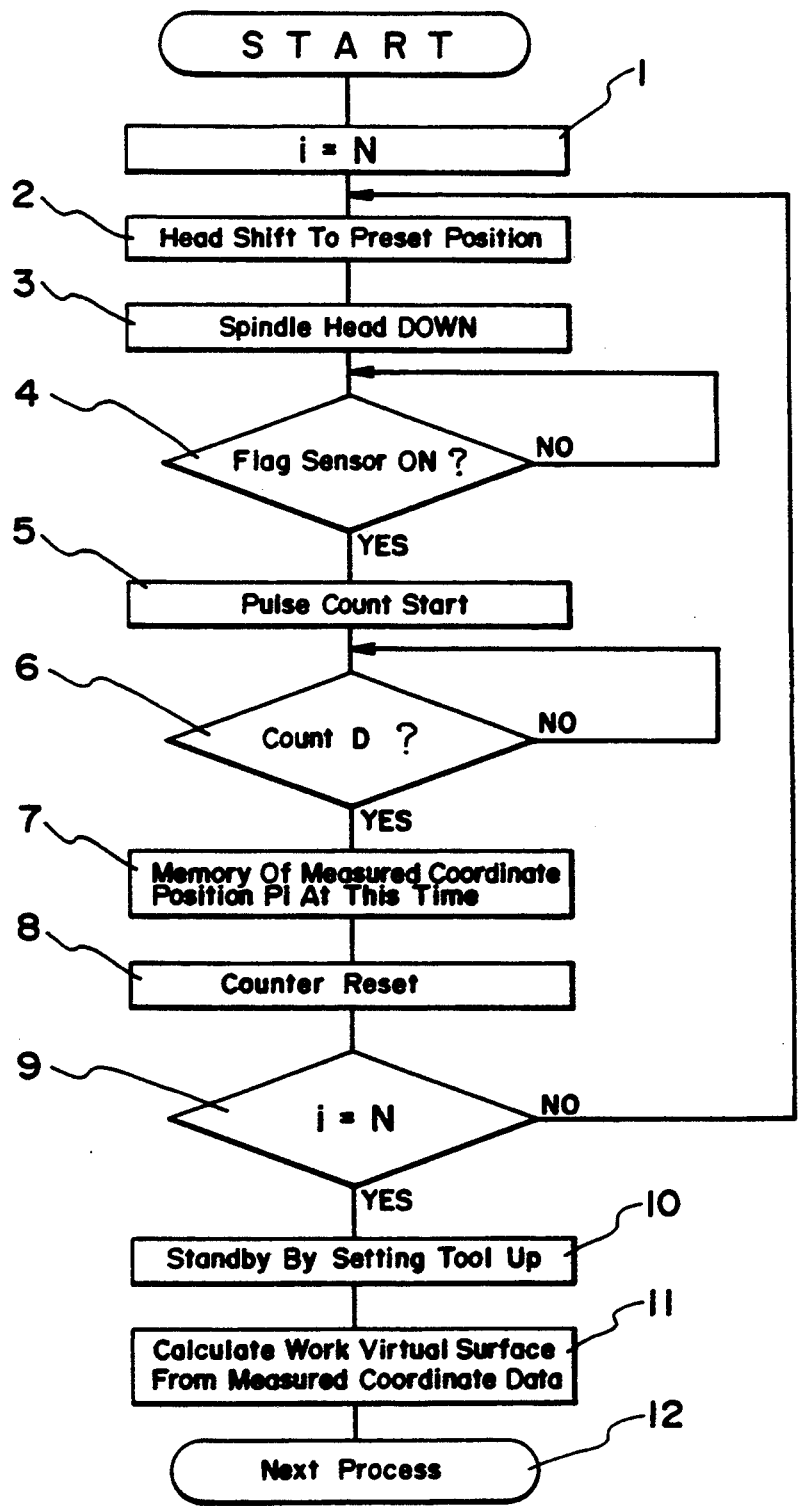
FIG. 13 is a flow chart showing the operation of a controller of a third embodiment of this invention.

A third embodiment of this invention will be described in detail in the following by referring to FIG. 13.

The construction of the three-dimensional processing machine to be used in this embodiment is identical with the construction shown in FIG. 1 through FIG. 3. In the controller of the three-dimensional processing machine, a program of finding out the imaginary surface data of the workpiece is stored.

First of all, the descending distance D of the head 20, from the basic height level of the spindle head 20 against the table 2 to a level where the tip of the tool 18 abuts on the work-detection sensor 42, is obtained by the operation shown in the flow chart, and it is stored in the controller.

Next, the operation of finding out the imaginary surface data of the workpiece 96 (refer to FIG. 9) to be actually processed will be described by referring to the flow chart shown in FIG. 13.

In the first place, the workpiece 96 is set on the table 2. In step 1, i=1 is set. Next, the operator controls the movement of the transfer member 4 in the XY axis direction on the table 2 by the manual switch, and moves the tip of the tool 18 above the measuring point P1 (refer to FIG. 10) on the work (step 2).

Next, the controller causes the spindle head 20 to descend from the highest lifting basic position (step 3). The controller counts the amount of descent from the highest lifting position of the spindle head 20 with the counter by means of the output pulse of an encoder of the spindle head 20. When the spindle head 20 descends, the pickup 36 abuts on the circumference of the measuring point P1 of the workpiece 96. The spindle head 20 continues to descend, and the perpendicular portion of the arm 32 rises relative to the spindle head 20 by accompanying the descent of the spindle head 20, and the flag 38 moves in the detection range of the flag sensor 40.

The controller judges if the flag sensor 40 turns ON or not in step 4, and if the affirmative is judged, the controller starts the counting of the pulses corresponding to the distance D, by the counter. When the completion of the counting of the pulses, corresponding to the distance D, is judged in step 6, the controller stores the pulse count from the highest lifting basic position of the spindle head 20 as the Z1 in step 7, and stores the position X1, Y1 on the XY axis of the spindle head 20 (step 5).

The X1, Y1, Z1 constitute the coordinate data on the XYZ axis of the measuring point P1. The operation is repeated by changing the measuring points by the predetermined distance until i=N is obtained, and the XYZ coordinates of the measuring point Pi on the workpiece 96 are sequentially measured. The coordinate data of each measuring point Pi is then stored. Next, the controller resets the counter in step 8. When the operator judges i=N in step 9, the spindle head 20 is lifted to the highest lifting position and stands by (step 10).

The controller finds the imaginary surface data 98 of the workpiece 96 as shown in FIG. 11 from the imaginary surface data (Xi, Yi, Zi) ($1 \leq i \leq N$) of each measuring point Pi. In effect, the above data 98 is obtained by utilizing the Bezier curve or B spline curve.

Next, the controller rotates the spindle 19, moves the transfer member 4 in the XY axis direction with the data 98 of the imaginary surface of the work as the Z axis base, controls the movement of the spindle head 20 in the Z axis direction, and performs the processing of a fixed depth on the workpiece 96 (step 12).

A fourth embodiment of this invention will be described in detail in the following by referring to FIG. 14 through FIG. 18.

Figure 18:
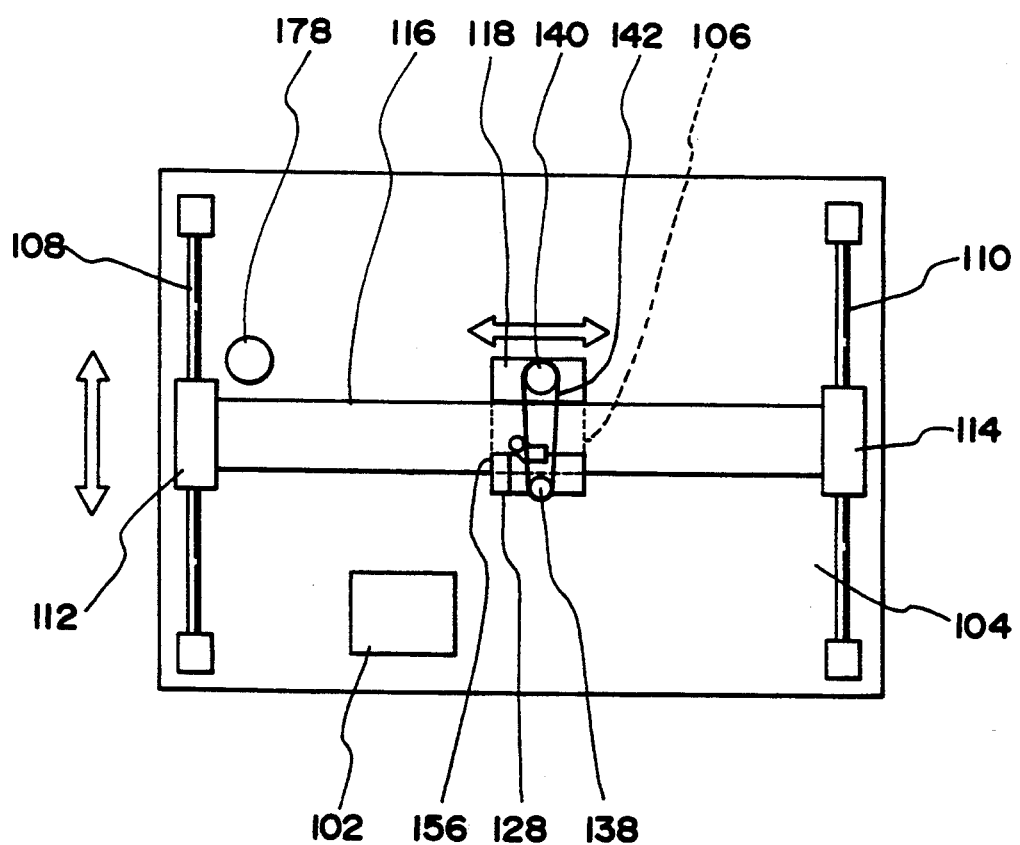
FIG. 18 is an entire schematic plan of the three-dimensional processing machine of the fourth embodiment of this invention.

FIG. 18 denotes a three-dimensional processing machine, and this processing machine is provided with a table 104 formed with a workpiece supporting surface for mounting and positioning the workpiece 102.

Numeral 106 denotes a transfer member, and the transfer member is supported by an XY guide mechanism capable of moving parallel in the desired XY axis direction in a plane parallel to the table 104. The XY guide mechanism is composed of Y axis rails 108 and 110 which are fixed to the table 104, and X axis rails 116 which are mounted on cursors 112 and 114 which are capable of moving along the rails. The transfer member 106 is movably connected to the X axis rail 116.

The cursors 112 and 114 and the transfer member 106 are connected to the drive device to be controlled by the controller.

The rear cursor 118 and a pair of head supporting cursors 120 and 122 are integrally fixed to the transfer member 106 and are positioned at both sides of the X axis rail 116. Slide shafts 124 and 126 are slidably inserted in guide holes engraved on the head supporting cursors 120 and 122 in a perpendicular direction. An upper plate portion 128a of the spindle head 128 is fixed to the upper ends of the slide shafts 124, 126, and the base 128b of the spindle head 128 is fixed to the lower ends of the slide shafts 124 and 126.

The head 128 is liftably supported in the range of a predetermined stroke on the head supporting cursors 120 and 122 by means of the slide shafts 124 and 126. A tubular spindle holder 130 is fixed to the front wall 128c of the head 128, and a tubular spindle 132 is inserted into the holder 130, by means of ball bearings 134 and 136, so that it is rotatable without slipping in the axial direction.

A belt pulley 138 is fixed to the upper part of the spindle 132. A motor (not shown) is fixed to the rear cursor 118, and an endless drive belt 142 is spanned between a pulley 140 for the drive, which is fixed to an output shaft of the motor, and the pulley 138.

A collet chuck 144 is disposed on the lower part of the spindle 132, and a tool 146 inserted and disposed in the spindle 132, is detachably fixed to the spindle 132 by means of the collet chuck 144.

A screw shaft 148 is rotatably mounted on the head 128 in a perpendicular direction, and a plate nut 150 fixed to the head supporting cursor 122 is screwed to the screw shaft 148. The screw shaft 148 is connected to the output shaft of the motor 152 for lifting the head which is fixed to the upper plate 128a of the head 128. When the screw shaft 148 rotates in both directions by the drive of the motor 152, the head 128 moves up in a perpendicular direction to the surface of the table 104 in a range of the predetermined stroke.

The lifting motion of the head 128 is converted to a pulse signal by means of a known encoder 154, and it is fed back to the controller. The controller measures and recognizes the amount of lift, from the basic position (zero position) of the head 128, by counting the pulse signals of the encoder 154 with the pulse counter.

Numeral 154 denotes an annular pickup, and the pickup is fixed to an arm 156. The pickup 154 is positioned at the bottom of the spindle 132, and is loosely fitted onto the tip of the tool 146.

The arm 156 is fixed to a block 158, and two slide shafts 162 and 164 are fixed to the block 158 by the clamping force of a shaft-fixing mould 160.

The slide shafts 162 and 164 are inserted and supported in guide holes, which are formed on the base 128b of the head 128, and are slidable in a direction perpendicular to the surface of the table 104.

A slit plate 168 is fixed to a mounting member 166, which is fixed to the upper parts of the slide shafts 162 and 164, and the slit plate 168 is loosely fitted to a concave reading portion of a sensor 170 which is fixed to the side plate of the head 128.

The slit plate 168 and the sensor 170 constitute a linear encoder, and the sensor 170 is connected to the controller.

In the condition where the lower end of the pickup 154 descends by the distance D to the lower end of the tool 146, the lower surface of the mounting member 166 abuts on a stopper 172, which is fixed to the base 128b, and the descent of the slide shafts 162 and 164 is engaged by this arrangement.

The slide shafts 162 and 164 are energized in the lower direction by return springs 174 and 176 made of coil springs, which are inserted on the slide shafts. The return springs 174 and 176 are compressed and disposed between the block 158 and the lower surface of the base 128b.

Figure 16:
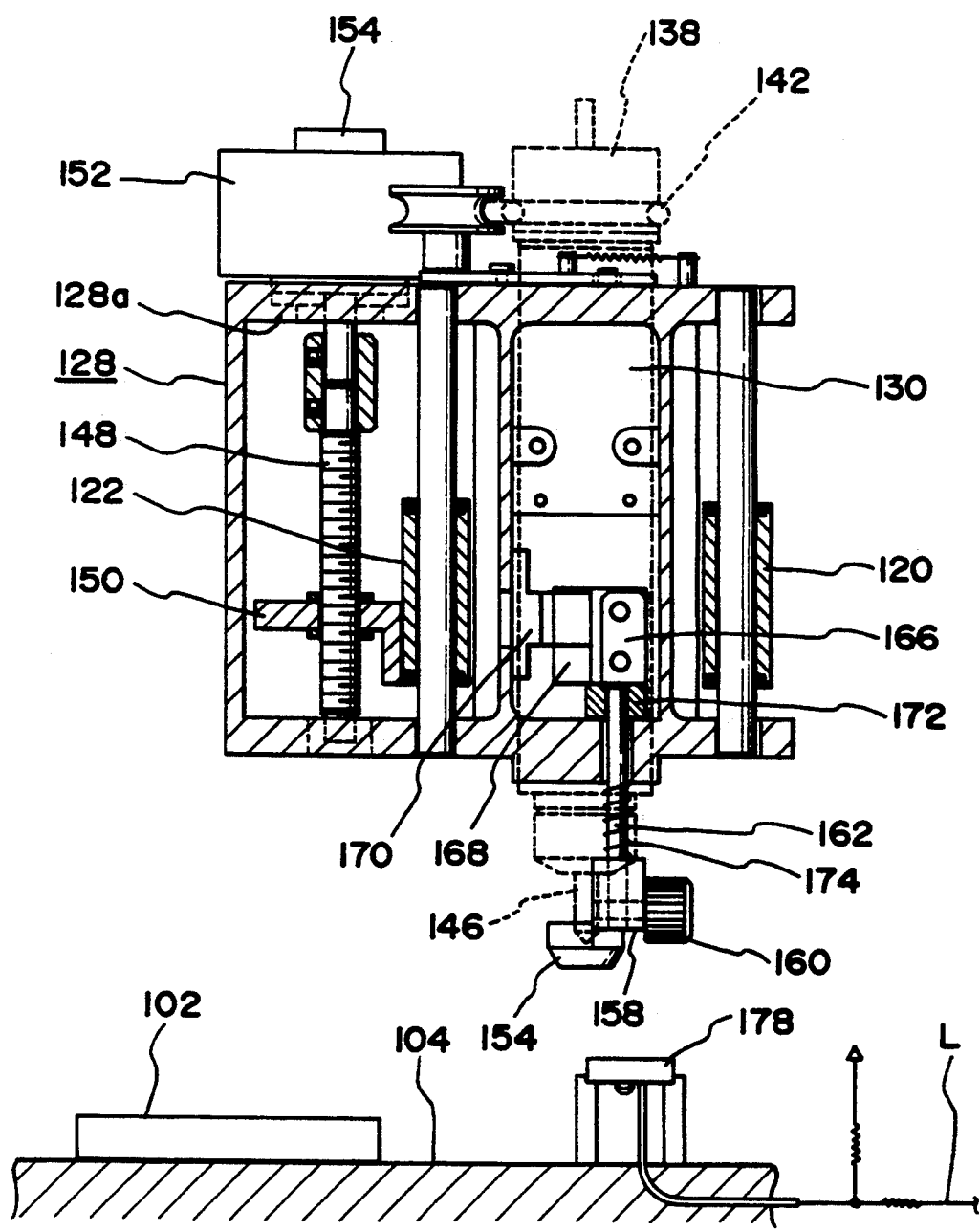
FIG. 16 is a cross section of a spindle head of the three-dimensional processing machine shown in FIG. 14.
Figure 17:
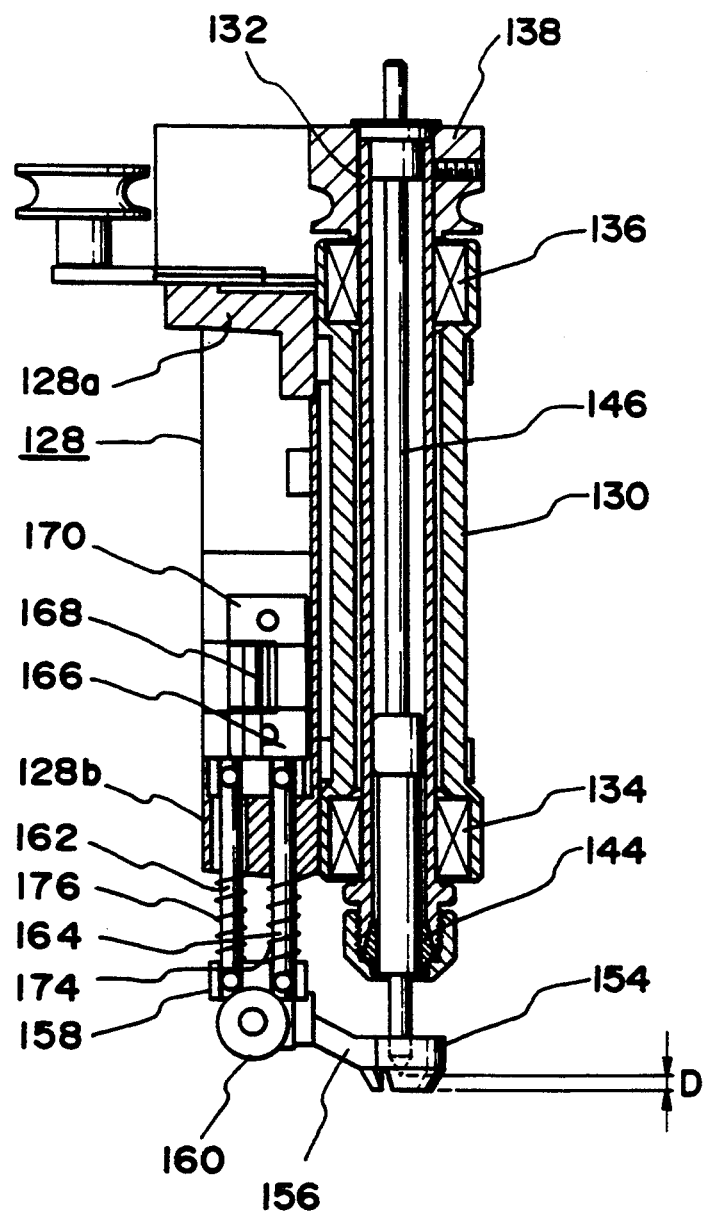
FIG. 17 is a cross section of a spindle of the three-dimensional processing machine shown in FIG. 14.

Numeral 178 denotes a work-detection sensor mounted and fixed to the plane of an insulator of the table 104, and a voltage is transmitted to the sensor as shown in FIG. 16.

When a conductor such as the tool 146 and the like touches the work-detection sensor 178, the sensor 178 is grounded through the conductor, and an object-detection signal is transmitted to the controller from the line (L).

Manual switches for controlling the drive device in the XY axis direction of the transfer member 106, the drive motor 152 for lifting the head 128 and the drive motor of the pulley 140 for drive, are provided on the operation panel of the three-dimensional processing machine.

The operation of this embodiment will be described in the following.

Firstly, the operation of measuring the distance D, between the lower end of the pickup 154 and the lower end of the tool 146, will be described.

The spindle 132 moves to a position above the work-detection sensor 178, and the head 128 descends at this position. When the pickup 154 abuts on the work-detection sensor 178, the slide shafts 162 and 164 rise relative to the head 128, by resisting the elastic force of the return springs 174 and 176. This rising is detected by the sensor 170 and the pulse signal is transmitted to the controller. The controller counts the pulses, and when the tip of the tool 146 abuts on the work-detection sensor 178, the controller stops the descent of the head 128.

The controller stores the amount of descent D of the head 128, as the distance D, in the memory.

Next, the operation of detecting the original point on the Z axis of the tool 146, against the workpiece 102 on the table 104 where the actual processing is carried out, will be described.

The controller moves the tool 146 to a position above the workpiece 102 to the condition where the head 128 is lifted, and causes the head 128 to descend, from the predetermined position, onto the workpiece 102. When the head 128 descends, firstly, the pickup 154 abuts on the workpiece 102, and when the pickup 154 rises by the distance D to the head 128, the position is confirmed by the output from the linear encoder. This position is made as the origin on the Z axis of the head 128.

The controller moves to a work processing operation, as it is, with the origin on the Z axis of the head 128 as the standard. It controls the lifting up and down of the head 128 from the workpiece 102 while rotating the spindle 132, causes the transfer member 106 to move in the X-Y axis direction, and applies the engraving processing automatically to the workpiece 102 by the tool 146. In the work processing, the slide shafts 162 and 164 lift up and down relative to the head 128 but follow the lifting up and down motion of the head 128 positively by the elastic force of the return springs 174 and 176.

A fifth embodiment of this invention will be described in the following by referring to FIG. 19 through FIG. 22.

Figure 19:
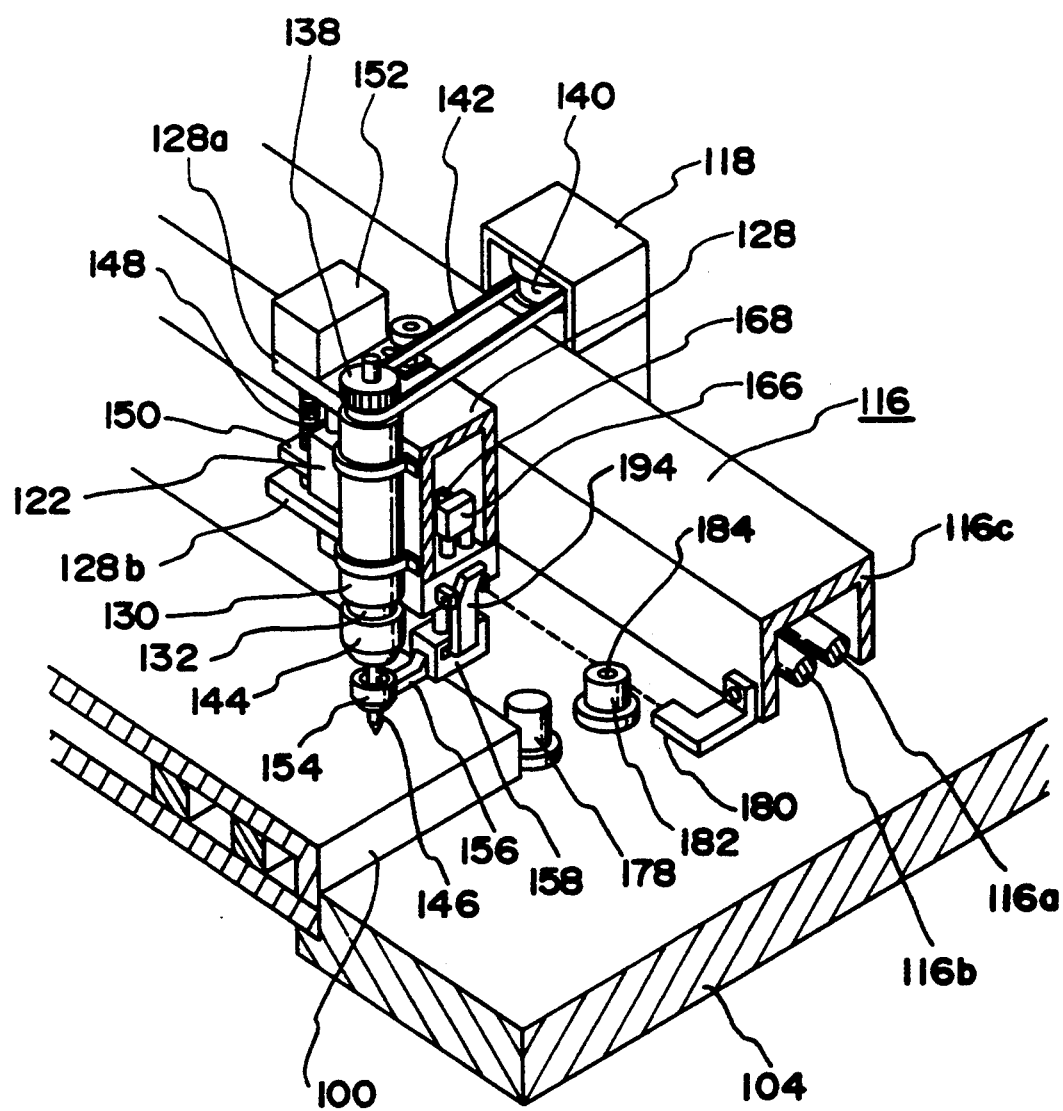
FIG. 19 is a sketch drawing of an essential part of the three-dimensional processing machine of the fifth embodiment of this invention.

FIG. 19 denotes a three,dimensional processing machine, and this machine is provided with the base 104 to which an operation plate 100 for mounting and positioning the workpiece 102 is fixed.

Numeral 106 denotes a transfer member, and the member is supported by the XY guide mechanism capable of moving parallel in the desired X-Y axis direction in a plane parallel to the base 104. The XY guide mechanism is composed of Y axis rails 108 and 110 which are fixed to the base 104; an X axis rail 116 consisting of a pair of parallel rail shafts 116a and 116b which are mounted on cursors 112 and 114, which are capable of moving along the Y axis rails; and a long cover rail 116c which covers the rail shafts 116a and 116b. The transfer member 106 is movably connected to the X axis rail 116.

Figure 20:
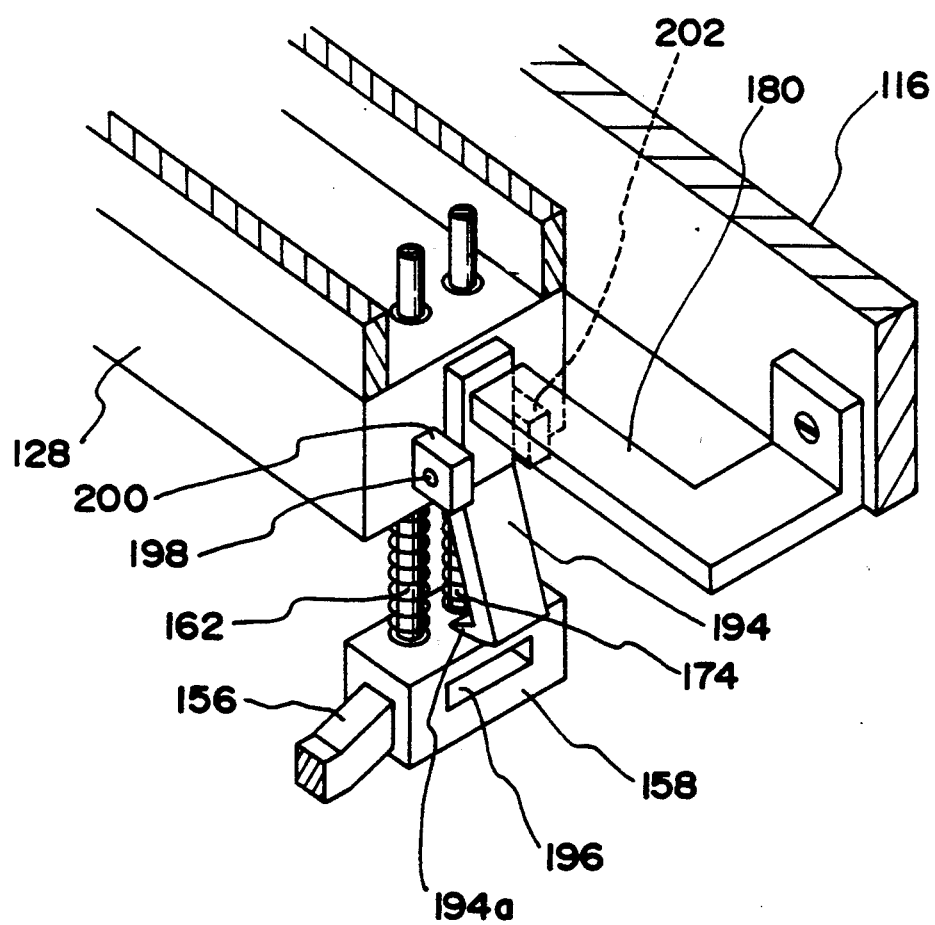
FIG. 20 is a sketch drawing of an essential part of the three-dimensional processing machine shown in FIG. 19.
Figure 21:
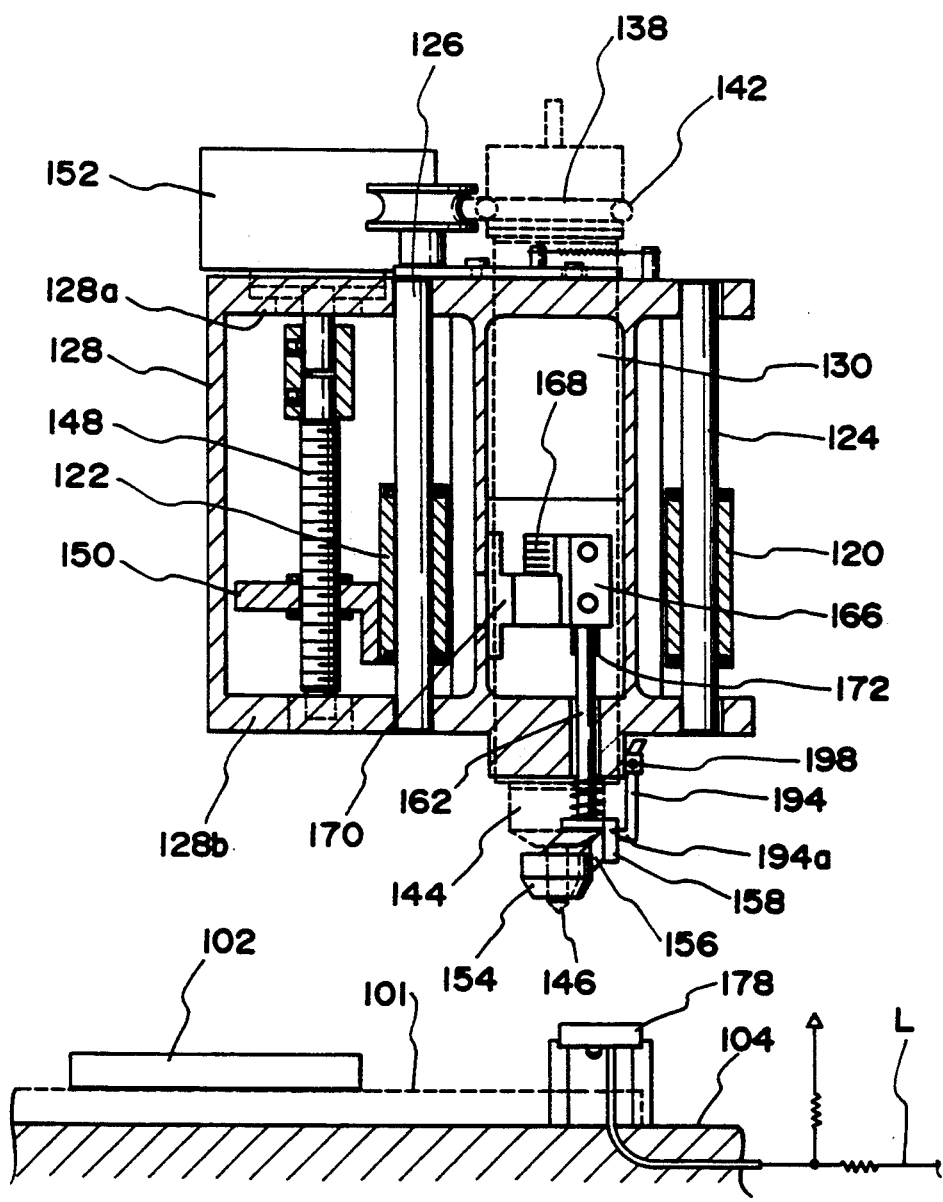
FIG. 21 is a cross section of a spindle head of the three-dimensional processing machine shown in FIG. 19.

Numeral 194 denotes a lock arm having a pawl portion 194a at its tip. The middle portion thereof is rotatably journalled by means of a shaft 198 on brackets 200 and 202 which are fixed to the lower sides of the head 128 centering on an axis orthogonal to the X axis rail 116 and being parallel to the surface of the table 104 as shown in FIG. 20.

An engaging concave portion 196 is engraved on the block 158 in correspondence to the pawl portion 194a of the lock arm 194. This engaging concave portion 196 corresponds to the pawl portion 194a in the condition where the pickup 154 rises to a predetermined lifting up position, to be engaged with the pawl portion 194a upon receiving it.

The upper portion of the lock arm 194 is biased in the direction of separating from the opposing surface of the spindle head 128. A lock releasing arm 180, opposed to the upper portion of the lock arm 194 on the X axis line, is fixed to the end portion of the X axis rail 116. The lock arm 194 is energized in the direction where the pawl portion 194a approaches the slide shafts 162 and 164 by a spring (not shown) working on the rotary shaft 198. The lock arm 194 is constructed in such a way that when its lower portion rotates almost parallel with the slide shafts 162 and 164.

Numeral 182 denotes a projection for the retreat of the pickup, and a tool housing concave portion 184 is formed in its central portion. The work-detection sensor 178 and the projection 182 are disposed outside, on the work processing operation area.

Figure 14:
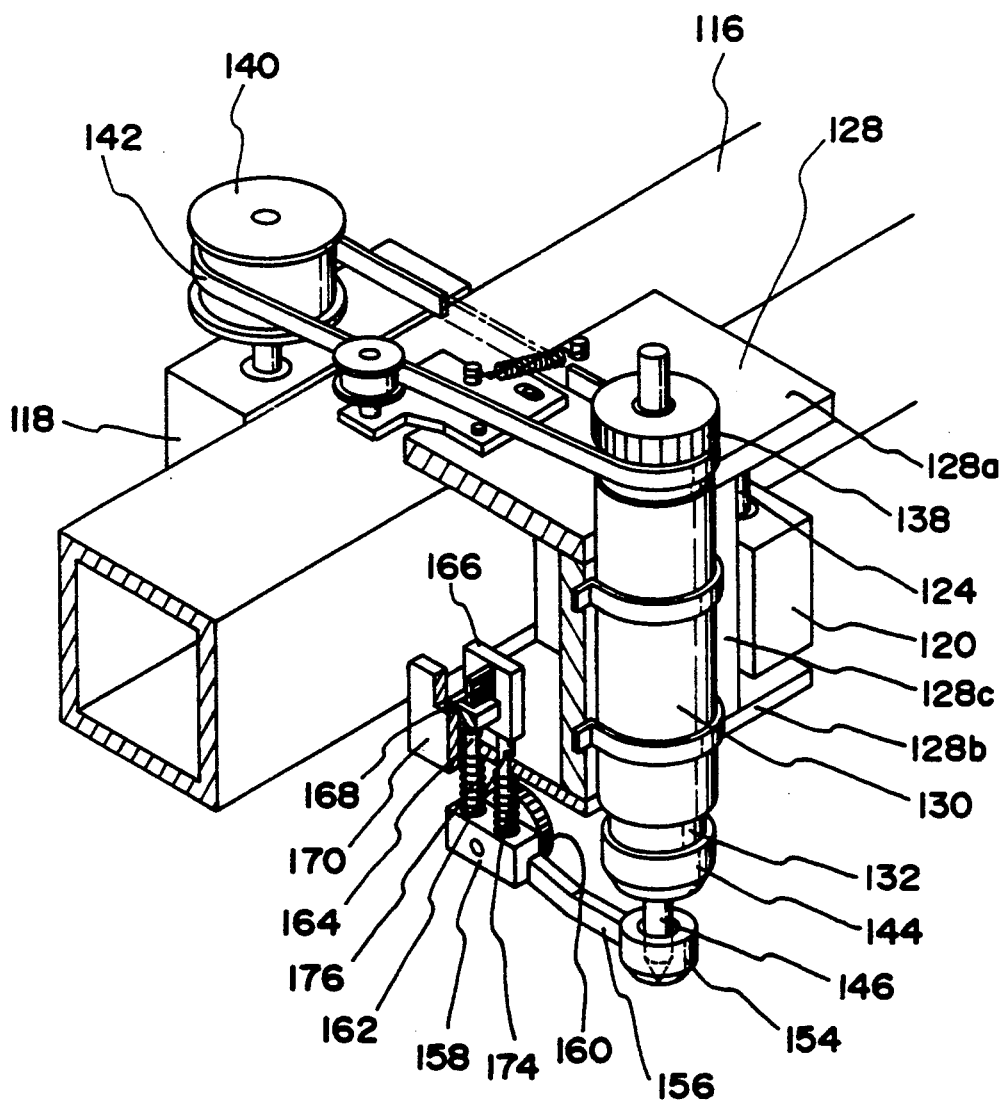
FIG. 14 is a sketch drawing of essential parts of the three-dimensional processing machine of a fourth embodiment of this invention.
Figure 15:
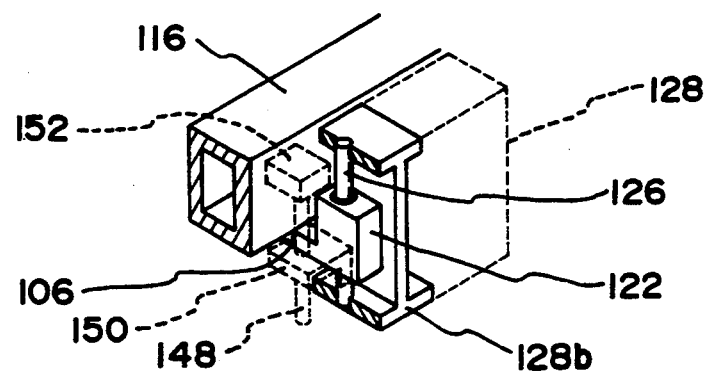
FIG. 15 is a sketch drawing of part of the three-dimensional processing machine shown in FIG. 14.

Other portions of this embodiment are almost identical with the embodiment shown in FIG. 14, and identical portions with the embodiment are labeled with identical reference numerals to clarify the corresponding structure.

The operation of this embodiment will be described in the following.

The offset distance D between the lower end of the pickup 154 and the tip of the tool 146 are measured beforehand. At the time of the work processing, the spindle head 128 descends, and the lower end of the pickup 154 abuts on the workpiece 102. The displacement of the pickup 154 against the spindle head 128 is detected whereby the height of the tool 146 against the workpiece 102, from the displacement-detection position of the pickup 154, can be detected. During the work processing, the pickup 154 is supported at the lifting up position, and the pickup 154 can be arranged not to abut on the surface of the workpiece 102.

The operation of supporting the pickup 154 at the lifting up position will be described in the following.

The controller lifts up the spindle head 128, moves the head 128 in a horizontal direction to the table 104, moves the pickup 154 to a position above the projection 182 for pickup retreat, and causes the head 128 to descend. By the descending of the head 128, the tool 146 enters the concave portion 184 of the projection 182, and the pickup 154 abuts atop the projection 182 for pickup retreat. When the spindle head 128 continues to descend, the block 158 lifts up by resisting the elastic force of the return springs. When the lower end of the pickup 154 lifts up by the predetermined distance from the lower end of the tool 146, the pawl portion 194a of the lock arm 194 fits into the engaging concave portion 196 of the block 158, by being guided by a slanting surface of the pawl portion 194a. Thus the pickup 154 is locked at the lifting up position by the lock arm 194.

Next, the controller lifts up the head 128, pulls out the tool 146 from the concave portion 184 of the projection 182 for pickup retreat, and moves to the work processing operation. The lock of the pickup 154 causes the head 128 to move along the X axis rail 116, which causes the lock arm 194 to collide with the upper portion of the lock arm 194, and the lock arm 194 to turn centering on the shaft 198 by the transfer power of the head 128, can be released. In fact, the pickup 154 may be locked at the lift up position, or this lock may be released manually by the operator, and in this case, the projection 182 for pickup retreat and the lock-releasing arm 180 may not be provided.

Figure 22:
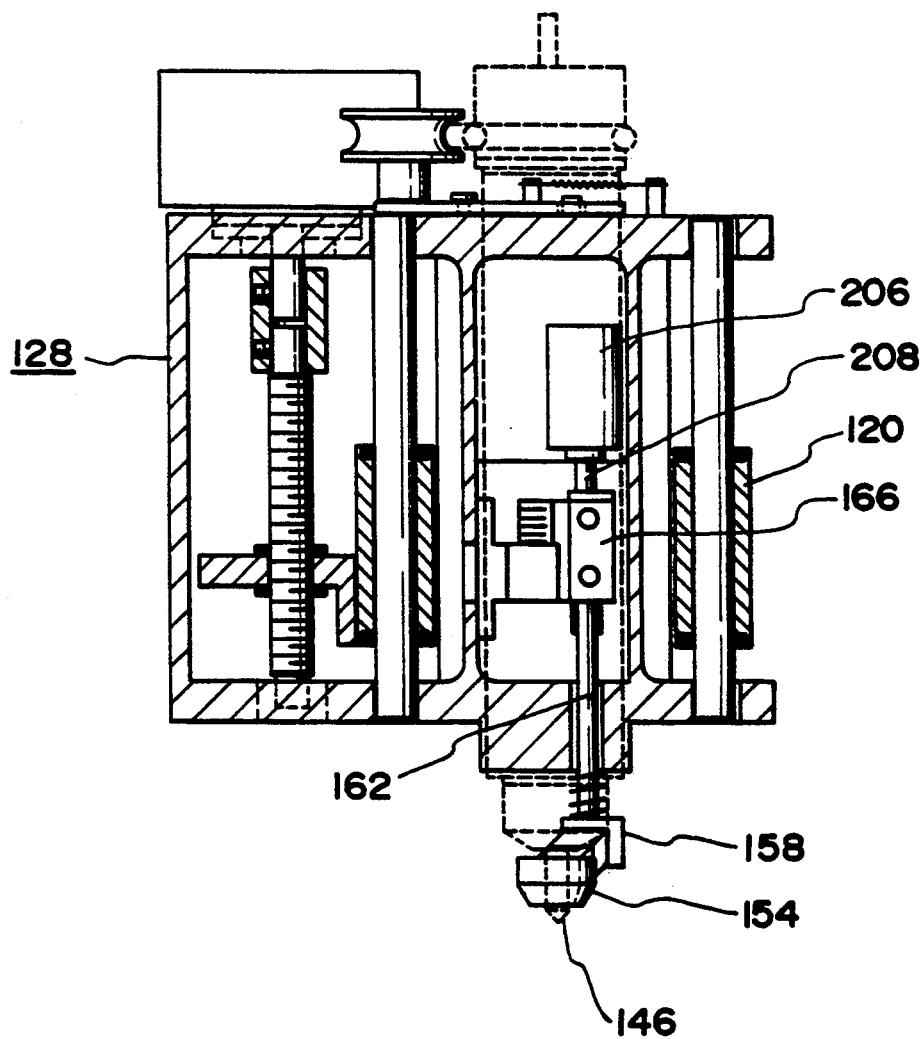
FIG. 22 is a cross section of a fifth embodiment of a spindle head of the three-dimensional processing machine.
Figure 23:
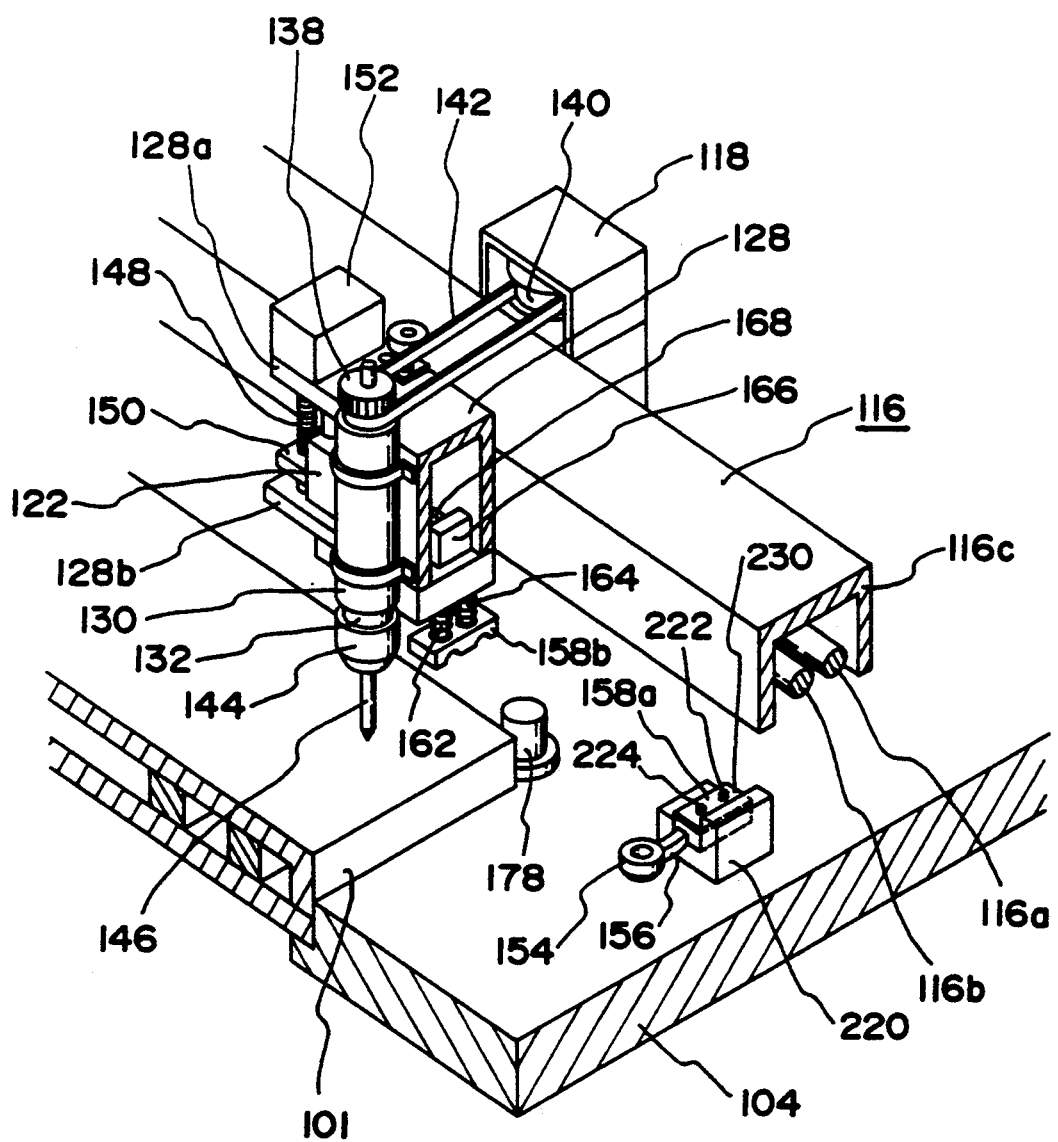
FIG. 23 is a sketch drawing of an essential part of the three-dimensional processing machine of a sixth embodiment of this invention.
Figure 24:
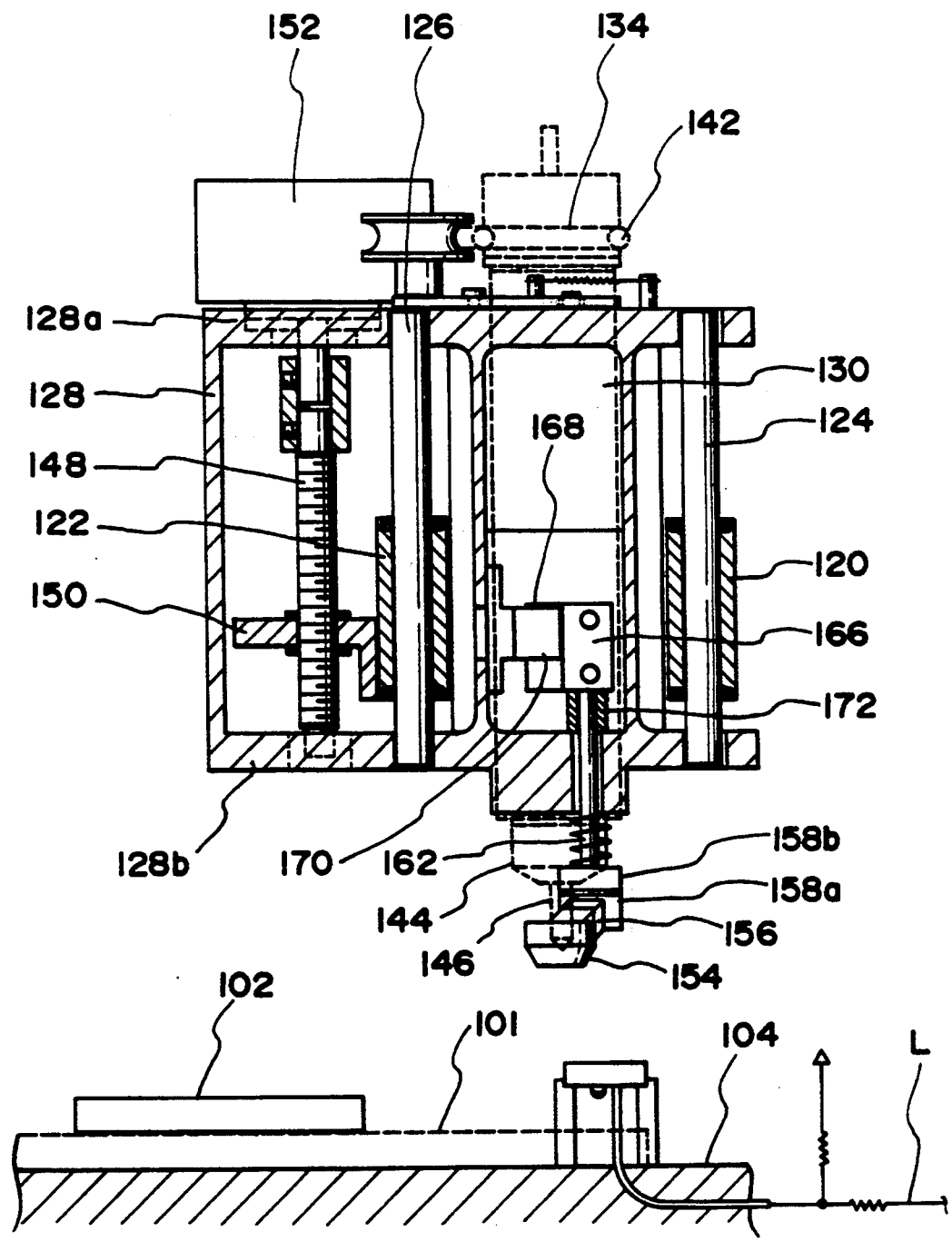
FIG. 24 is a cross section of a spindle head of the three-dimensional processing machine shown in FIG. 23.
Figure 25:
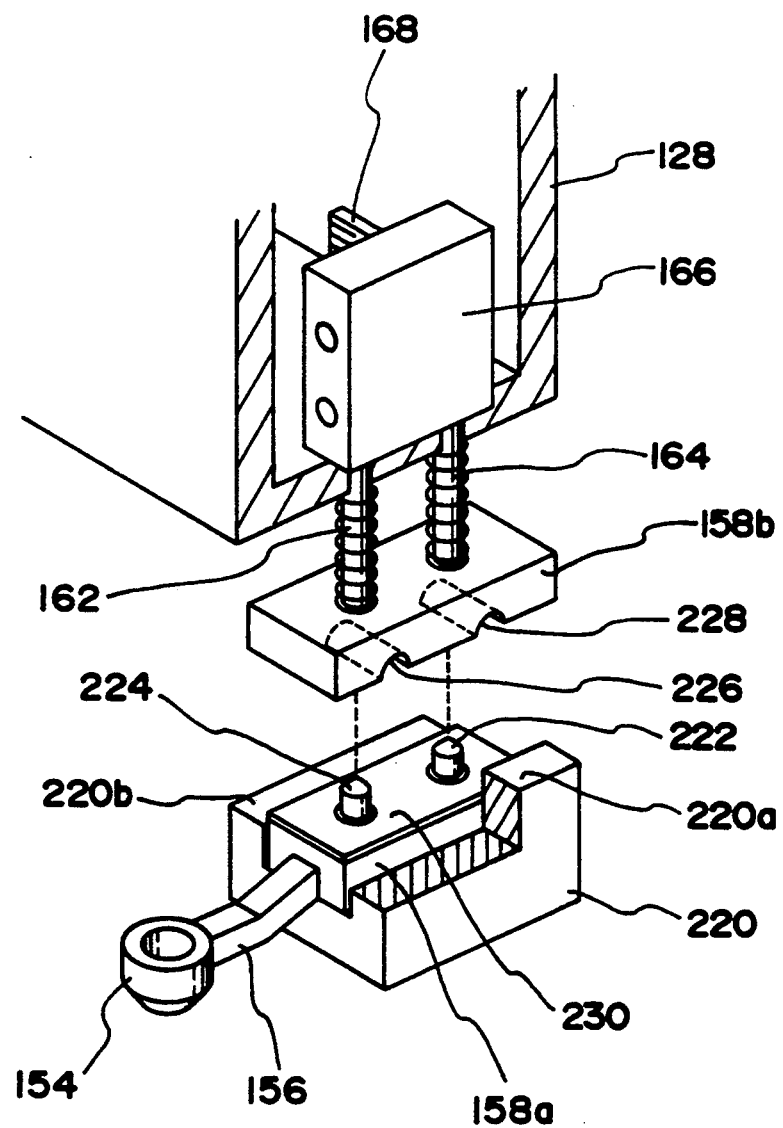
FIG. 25 is a decomposed sketch drawing of an essential part of the three-dimensional processing machine shown in FIG.23.

In addition, as shown in FIG. 22, a solenoid 206 is fixed to the spindle head 128, and the upper end of the mounting member 166 is connected to the output shaft 208 of the solenoid 206, and the pickup 154 may be supported at the lift up position against the tool 146. When the solenoid 206 is energized, the output shaft 208 is attracted and the slide shaft 162 rises, and is retained at the lift up position.

When the energization to the solenoid 206 is released, the output shaft 208 becomes idle, and the pickup 154 descends to the predetermined position where it projects for the lower part of the tool 146 by its weight and the resilient force of the return spring.

A sixth embodiment of this invention will be described in the following by referring to FIG. 23 through FIG. 27.

Figure 27:
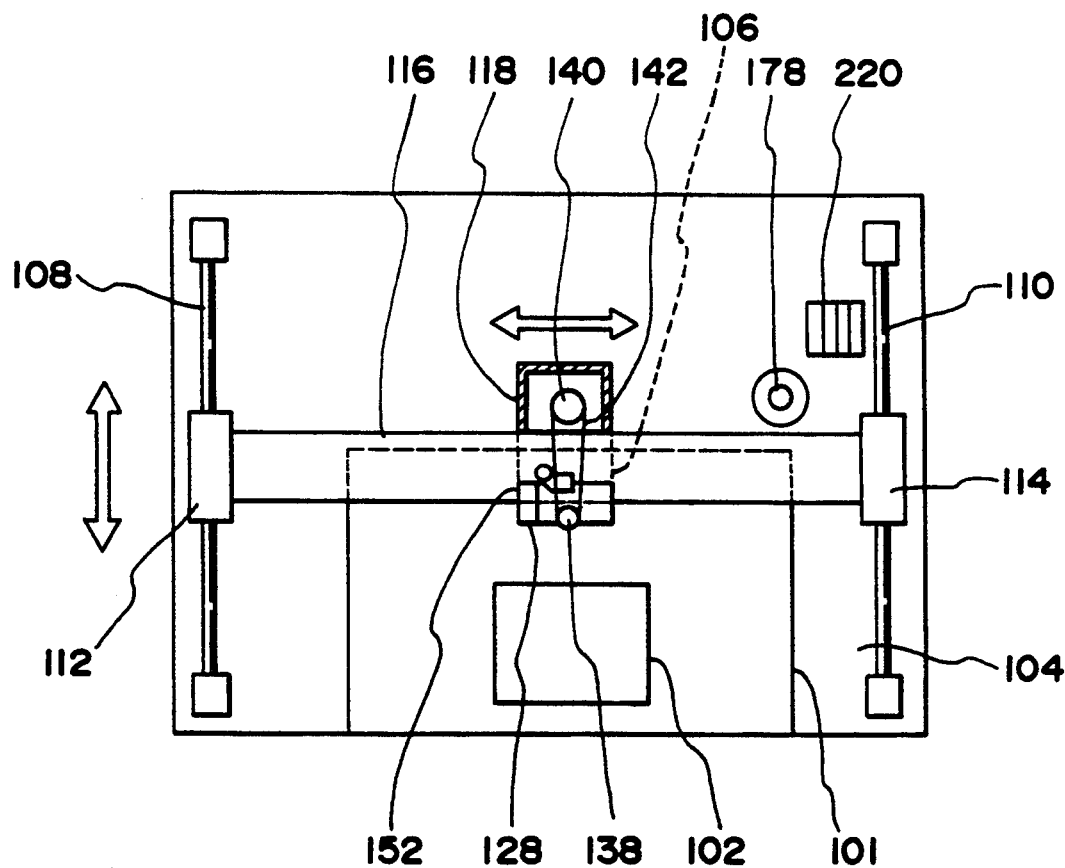
FIG. 27 is an entire schematic plan of the three-dimensional processing machine shown in FIG. 23.

FIG. 27 denotes a three-dimensional processing machine, which is provided with the table 104 fixed to an operation plate 101 for mounting and positioning the workpiece 102.

Numeral 154 denotes a pickup consisting of an annular conductor, which is fixed to the arm 156. The tool 146 is loosely fitted in the pickup 154. A rectangular parallelepiped pickup supporting block 158a is fixed to the arm 156. The block 158b is fixed to two parts of the slide shafts 162 and 164. A pair of positioning pins 222 and 224 are projecting on the block 158a. A magnet 230 is fixed on the upper surface of the block 158a. The slide shafts 162 and 164 are inserted slidably into the guide holes, formed on the bottom plate 128b of the head 128, in a perpendicular direction to the surface of the table 104. Long holes 226 and 228 are formed on the lower surface of the pickup mounting block 158b in a direction parallel to the Y axis rails 108 and 110. The blocks 158a and 158b are bonded by means of a magnetic force, and in the bonded condition, the positioning pins 222 and 224 fit into the long holes 226 and 228.

Numeral 220 denotes a pickup housing member, which is fixed to the work processing area on top of the table 104. A block housing concave portion 220d is provided on the pickup housing member 220, and rising portions 220a and 220b are formed at both sides on the X axis of the concave portion 220d.

Of the two rising portions 220b and 220a, at least the rising portion 220 of the central portion side of the table 104 is so set that the height of the Z axis direction, from the bottom surface of the concave portion 220d, is lower than the height of the Z axis direction of the pickup support block 158a.

Other portions of this embodiment are almost identical with the embodiment shown in FIG. 19, and identical portions of the embodiment are labeled with identical reference numerals to clarify the corresponding structure.

The operation of this embodiment will be described in the following.

The operation of measuring the distance D, between the lower end of the pickup 154 and the lower end of the tool 146 positioned above the pickup, is identical with the embodiment shown in FIG. 19.

Also, the operation of detecting the origin on the Z axis of the tool 146 against the work 102 on the table 104, to which the actual processing is applied, is identical with the embodiment shown in FIG. 19.

Figures 26A, 26B:
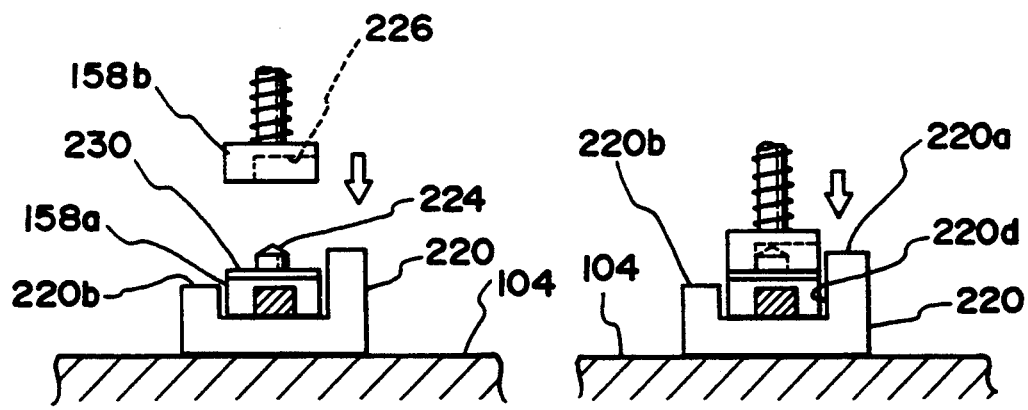
FIGS. 26(A)–26(D) are operation explanatory views of the three-dimensional processing machine shown in FIG. 23.
Figures 26C, 26D:
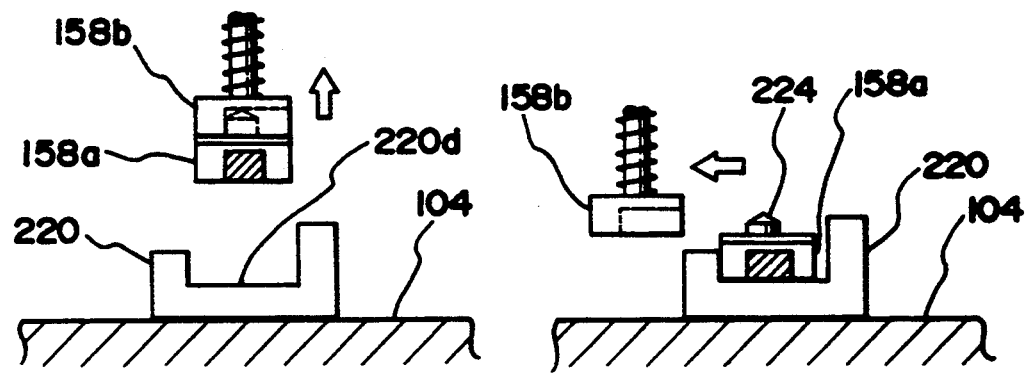

After detecting the origin on the Z axis of the tool 146, the controller lifts up the spindle head 128, moves the head 128 in a horizontal direction to the table 104, moves the support block 158a to a position above the pickup housing member 220 as shown in FIG. 26C, causes the head 128 to descend at this position and causes the support block 158a to insert into the concave portion 220d shown in FIG. 26B.

Next, when the head 128 moves to the center of the table 104 along the X axis rail 116, as shown in FIG. 26D, the pickup support block 158a is released from the mounting block 158b, by resisting the magnetic force of the magnet 130, and the support block 158a remains in the concave portion 220d of the pickup housing member 220. In the case of fixing the support block 158a to the pickup mounting block 158b, the head 128 moves and causes the mounting block 158b to move to a position above the pickup housing member 220 (FIG. 26A). Next, in the condition where the head 128 descends and the positioning pins 222 and 224 are inserted into the long holes 226 and 228 of the mounting block 158b, the block 158b is bonded to the block 158a by the magnetic force (FIG. 26B). Next, the head 128 lifts up, and the pickup support block 158a is lifted up from the pickup housing member 220.

Figure 28:
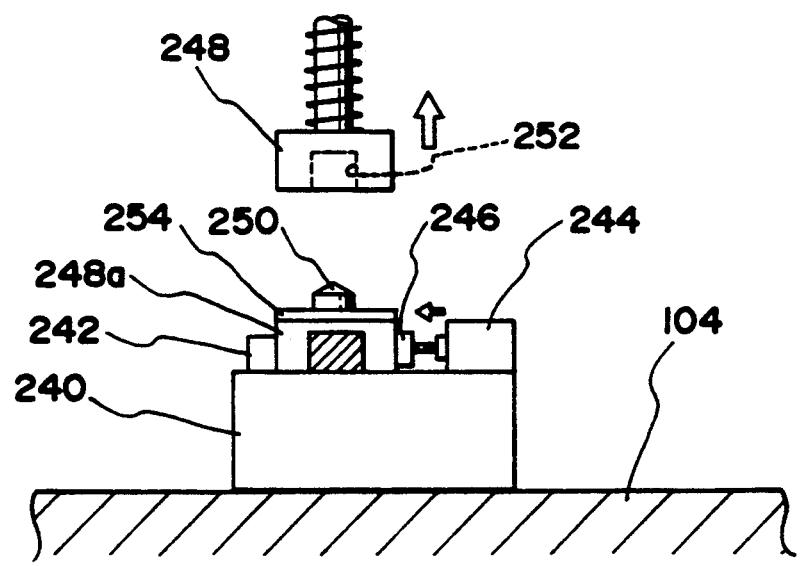
FIG. 28 is an operation explanatory view of the three-dimensional processing machine of a seventh embodiment of this invention.
Figure 29:
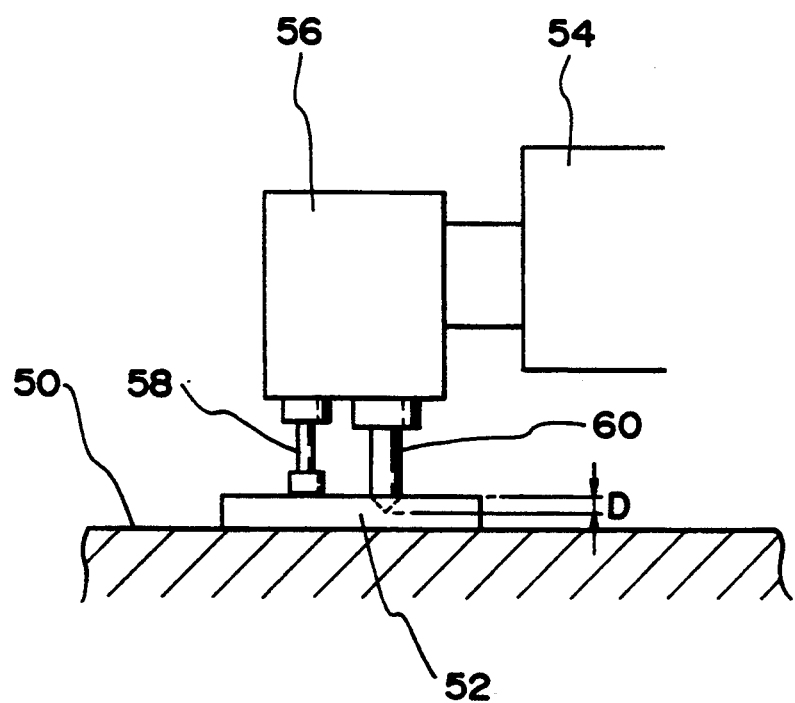
FIG. 29 is a side view of the conventional technology.

In addition, as shown in FIG. 28, the pickup housing member 240 is erected on the table 104 which is positioned away from the work processing area. A positioning guide 242 and a solenoid 244 are disposed on the upper surface of the housing member 240, and the pickup support block 248a may be disposed between the positioning guide 242 and the pressure member 246 which is fixed to the output shaft of the solenoid 244, whereby a pickup detaching mechanism is constructed.

In the foregoing construction, when the solenoid 244 is energized, the support block 248a on the pickup housing member 240 is under pressure from the positioning guide 242 and the pressure member 246, and the support block 248a is fixed to the upper surface of the pickup housing member 240. When the energization of the solenoid 244 is released, the fixing of the support block 248a is released.

In this construction, mounting and dismounting of the pickup support block 248a against the pickup mounting block 248b are achieved by the vertical motion on the Z axis of the head 128.

In the drawing, numeral 254 denotes a magnet, 250 denotes a positioning pin, and 252 denotes a positioning hole. In the foregoing embodiments the detaching of the pickup 154 from the spindle head 128 is achieved automatically by the control of the controller, but the detaching of the pickup 154 may be achieved manually by the operator.

What is claimed is:

1. A method of processing a workpiece in three dimensions in which a spindle head which supports a tool is moved in x, y, and z directions, said method comprising the steps of:
    moving the tool in the x and y directions to an initial position over the workpiece;
    lowering the tool in the z direction to an abutment position wherein the tool abuts against the workpiece;
    measuring the distance between the initial position and the abutment position;
    repeating said moving and said lowering steps a predetermined number of times while varying said initial position;
    determining an imaginary surface contour of the workpiece based on the initial positions and the abutment positions to allow a predetermined depth from the surface of the workpiece to be obtained during processing of the workpiece with reference to said imaginary surface.

2. A method of processing a workpiece in three dimensions in which a spindle head which supports a tool is moved in x, y, and z directions, a pickup extends beyond a distal end of said tool in the z direction by a predetermined distance, when said pickup is in a lowest position and a pickup displacement detecting means is provided for detecting when said pickup has moved from said lowest position, said method comprising the steps of:
    moving the tool in the x and y directions to an initial position over the workpiece;
    lowering the tool in the z direction to an abutment position wherein the pickup abuts against the workpiece and is moved from said lowest position;
    measuring the distance between the initial position and the abutment position;
    repeating said moving and said lowering steps a predetermined number of times while varying said initial position;
    determining an imaginary surface contour of the workpiece based on the initial positions and the abutment positions to allow a predetermined depth from the surface of the workpiece to be obtained during processing of the workpiece with reference to said imaginary surface.

3. A method for processing a workpiece in a three-dimensional processing machine, comprising the steps of:
    moving a spindle head provided with a tool in an XY axis direction with respect to a surface of a table;
    lowering the spindle head in the Z axis direction perpendicular to said surface of the table;
    measuring the amount of descent of the spindle head from a standard position thereof and applying a predetermined depth processing to the workpiece with the tool;
    characterized in that the method further comprises the steps of moving the spindle head above a plurality of measuring points defined on the workpiece surface before processing, lowering the spindle head from said standard position until the lower end of said tool abuts on the workpiece, measuring the amount of descent from said standard position of the spindle head, determining imaginary surface data of the workpiece on the basis of the respective coordinate values of each of the measuring points, said coordinate values being constituted by XY position data, and an amount of descent of the spindle head in the Z direction, utilizing a Bezier curve or a B spline curve analysis, and controlling the movement of the spindle head, with the imaginary surface data as basis on the Z axis, during the predetermined depth processing on the workpiece (96).

4. A method according to claim 3, further comprising the steps of:

lowering the spindle head before the work processing until a pickup liftably supported on the spindle head and projecting below the lower end of the tool abuts on an object detection sensor;

continuing the lowering step to move the pickup with respect to the tool;

detecting relative movement of the pickup with respect to a basic position of the pickup;

abutting the lower end of the tool on the object detection sensor; and measuring and memorizing the descending distance of the spindle head between the basic position of the pickup and the abutting position of the tool;

characterized in that for measuring said points on the workpiece surface the method further comprises the steps of lowering the spindle head from the standard position until the basic position of the pickup is reached, calculating said amount of descent on the basis of said memorized descending distance without contacting said tool with said workpiece.

5. A method according to claim 4, further comprising the steps of:

releasing said pickup at an elevated position higher than the tool during the predetermined depth processing on the workpiece.

6. A method according to claim 4, further comprising the steps of removing the pickup from the spindle head during the predetermined depth processing on the workpiece.

* * * * *